United States Patent
Ichikawa

(10) Patent No.: US 9,073,442 B2
(45) Date of Patent: *Jul. 7, 2015

(54) INDUCTIVELY CHARGED VEHICLE WITH AUTOMATIC POSITIONING

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

This patent is subject to a terminal disclaimer.

(21) Appl. No.: 13/583,341

(22) PCT Filed: Mar. 9, 2011

(86) PCT No.: PCT/IB2011/000502
§ 371 (c)(1),
(2), (4) Date: Sep. 7, 2012

(87) PCT Pub. No.: WO2011/114208
PCT Pub. Date: Sep. 22, 2011

(65) Prior Publication Data
US 2013/0037365 A1 Feb. 14, 2013

(30) Foreign Application Priority Data
Mar. 16, 2010 (JP) ................. 2010-058793

(51) Int. Cl.
*B60L 11/18* (2006.01)
*B60L 11/12* (2006.01)
*B60L 11/14* (2006.01)

(52) U.S. Cl.
CPC ........... *B60L 11/182* (2013.01); *B60L 11/123* (2013.01); *B60L 11/14* (2013.01); *B60L 11/1831* (2013.01);

(Continued)

(58) Field of Classification Search
CPC ..... B60L 9/16; B60L 11/182; B60L 11/1824; B60L 11/1827; B60L 11/1829; B60L 11/1831; B60L 11/1833; B60L 11/1835
USPC ................................. 191/10; 320/108, 109
See application file for complete search history.

(56) References Cited

U.S. PATENT DOCUMENTS 4,800,328 A    1/1989  Bolger et al.
5,617,003 A *  4/1997  Odachi et al. .................. 320/108
(Continued)

FOREIGN PATENT DOCUMENTS

AU    2006269374 C1    1/2007
AU    2007349874 A1   10/2008
(Continued)

OTHER PUBLICATIONS

Dec. 9, 2011 Office Action issued in Japanese Patent Application No. 2010-058793 (with translation).
Dec. 9, 2011 International Search Report issued in PCT/IB2011/000502.
Jul. 9, 2012 Written Opinion issued in PCT/IB2011/000502.
"Wireless Power Transfer via Strongly Coupled Magnetic Resonances", Science, Jul. 6, 2007, vol. 317, pp. 83-86.
Office Action issued in U.S. Appl. No. 12/992,958 on Jan. 4, 2013.
(Continued)

*Primary Examiner* — Zachary Kuhfuss
(74) *Attorney, Agent, or Firm* — Oliff PLC

(57) ABSTRACT

An electric vehicle receives electric power, in a non-contact manner, from an electric power transmitting coil provided externally to the vehicle. The electric vehicle includes an electric power receiving unit that is disposed at a bottom of the vehicle and receives electric power from the electric power transmitting unit via electromagnetic field resonance; a camera that captures an image of the outside; and a display unit that displays an outside view from the vehicle that is captured by the camera. The electric power receiving unit is disposed at a position that is offset toward a peripheral face, on which the camera is disposed, with respect to the center of the bottom in the longitudinal direction of the vehicle.

12 Claims, 19 Drawing Sheets

(52) U.S. Cl.
CPC ......... *B60L 11/1833* (2013.01); *B60L 11/1835* (2013.01); *B60L 2210/14* (2013.01); *B60L 2210/40* (2013.01); *B60L 2220/14* (2013.01); *Y02T 10/7005* (2013.01); *Y02T 10/7088* (2013.01); *Y02T 90/12* (2013.01); *Y02T 90/122* (2013.01); *Y02T 90/125* (2013.01); *Y02T 90/14* (2013.01); *Y02T 10/7077* (2013.01); *Y02T 10/7241* (2013.01); *Y02T 10/7225* (2013.01); *Y02T 90/127* (2013.01); *Y02T 10/6217* (2013.01); *Y02T 90/121* (2013.01); *Y02T 10/7275* (2013.01)

(56) References Cited

U.S. PATENT DOCUMENTS

| | | | |
|---|---|---|---|
| 5,703,461 A | 12/1997 | Minoshima et al. | |
| 5,821,731 A | 10/1998 | Kuki et al. | |
| 5,850,135 A | 12/1998 | Kuki et al. | |
| 6,014,597 A | 1/2000 | Kochanneck | |
| 6,223,847 B1 | 5/2001 | Shimizu et al. | |
| 6,934,603 B1 | 8/2005 | Kochanneck | |
| 7,602,143 B2 | 10/2009 | Capizzo | |
| 7,741,734 B2 | 6/2010 | Joannopoulos et al. | |
| 7,880,337 B2 | 2/2011 | Farkas | |
| 8,030,888 B2 | 10/2011 | Pandya et al. | |
| 8,033,349 B2 * | 10/2011 | Ortmann et al. | 180/65.1 |
| 8,169,340 B2 | 5/2012 | Oyobe et al. | |
| 8,378,524 B2 | 2/2013 | Mita | |
| 8,463,536 B2 | 6/2013 | Yamamoto | |
| 8,466,654 B2 * | 6/2013 | Cook et al. | 320/109 |
| 8,483,899 B2 * | 7/2013 | Martin | 701/22 |
| 8,519,569 B2 | 8/2013 | Shimokawa | |
| 2002/0149673 A1 | 10/2002 | Hirama et al. | |
| 2003/0122687 A1 | 7/2003 | Trajkovic et al. | |
| 2004/0267420 A1 | 12/2004 | Tanaka et al. | |
| 2005/0264432 A1 | 12/2005 | Tanaka et al. | |
| 2006/0180362 A1 * | 8/2006 | Yamaguchi et al. | 180/65.2 |
| 2007/0131505 A1 | 6/2007 | Kim | |
| 2007/0222542 A1 | 9/2007 | Joannopoulos et al. | |
| 2008/0278264 A1 | 11/2008 | Karalis et al. | |
| 2009/0040068 A1 | 2/2009 | Oyobe et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2009/0299918 A1 | 12/2009 | Cook et al. | |
| 2009/0313174 A1 | 12/2009 | Hafner et al. | |
| 2010/0045114 A1 | 2/2010 | Sample et al. | |
| 2010/0052431 A1 | 3/2010 | Mita | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0117596 A1 * | 5/2010 | Cook et al. | 320/108 |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0187913 A1 | 7/2010 | Smith et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0225271 A1 | 9/2010 | Oyobe et al. | |
| 2010/0231053 A1 | 9/2010 | Karalis et al. | |
| 2010/0235006 A1 * | 9/2010 | Brown | 700/286 |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0241440 A1 | 10/2011 | Sakoda et al. | |
| 2011/0254503 A1 * | 10/2011 | Widmer et al. | 320/108 |
| 2011/0270462 A1 | 11/2011 | Amano et al. | |
| 2012/0043172 A1 | 2/2012 | Ichikawa | |
| 2012/0091959 A1 * | 4/2012 | Martin et al. | 320/109 |
| 2012/0098348 A1 | 4/2012 | Inoue et al. | |
| 2012/0098483 A1 * | 4/2012 | Patel | 320/108 |
| 2013/0037365 A1 | 2/2013 | Ichikawa | |
| 2013/0038715 A1 | 2/2013 | Ichikawa | |

FOREIGN PATENT DOCUMENTS

| | | |
|---|---|---|
| AU | 2010200044 A1 | 1/2010 |
| CA | 2615123 A1 | 1/2007 |
| CA | 2682284 A1 | 10/2008 |
| CN | 101258658 A | 9/2008 |
| CN | 101277838 A | 10/2008 |
| CN | 101682216 A | 3/2010 |
| CN | 101860089 A | 10/2010 |
| DE | 10 2008 046 215 A1 | 9/2009 |
| EP | 0 986 034 A2 | 3/2000 |
| EP | 1 902 505 A2 | 1/2007 |
| EP | 1 930 203 A1 | 6/2008 |
| EP | 2 130 287 A1 | 10/2009 |
| IN | IN735/DELNP/2008 | 5/2008 |
| IN | IN6195/DELNP/2009 | 7/2010 |
| JP | A-09-102329 | 4/1997 |
| JP | A-9-213378 | 8/1997 |
| JP | A-9-215211 | 8/1997 |
| JP | 10-117407 | 5/1998 |
| JP | A-11-001177 | 1/1999 |
| JP | A-2003-182489 | 7/2003 |
| JP | A-2004-229425 | 8/2004 |
| JP | A-2004-291865 | 10/2004 |
| JP | A-2005-080324 | 3/2005 |
| JP | A-2005-512893 7 | 5/2005 |
| JP | A-2006-288034 | 10/2006 |
| JP | A-2007-097345 | 4/2007 |
| JP | A-2007-159359 | 6/2007 |
| JP | A-2008-174102 | 7/2008 |
| JP | A-2009-501510 | 1/2009 |
| JP | A-2009-106136 | 5/2009 |
| JP | 2010-119246 A | 5/2010 |
| JP | 2010-141976 A | 6/2010 |
| JP | A-2010-183813 | 8/2010 |
| JP | 2010-206866 A | 9/2010 |
| JP | 2010-252446 A | 11/2010 |
| JP | A-2011-182608 | 9/2011 |
| KR | 20080031398 A | 4/2008 |
| KR | 20100015954 A | 2/2010 |
| RU | 2 297 928 C1 | 4/2007 |
| WO | WO 03/055734 A1 | 7/2003 |
| WO | WO 2007/008646 A2 | 1/2007 |
| WO | WO 2008/118178 A1 | 10/2008 |
| WO | 2009/054221 A1 | 4/2009 |
| WO | WO 2010/052785 A1 | 5/2010 |
| WO | 2010/067763 A1 | 6/2010 |

OTHER PUBLICATIONS

Office Action issued in U.S. Appl. No. 12/992,958 on Jun. 12, 2013.
Russian Patent Office, Office Action issued in Application No. 2011122824/11 dated May 4, 2012 w/English-language Translation.
Office Action issued in U.S. Appl. No. 13/635,762 on Jul. 24, 2014.
F. Gomez-Bravo et al., "Parallel and diagonal parking in nonholonomic autonomous vehicles", Engineering Applications of Artificial Intelligence 14, 2001, pp. 419-434.
Sep. 10, 2014 Office Action issued in U.S. Appl. No. 13/504,806.
Nov. 18, 2014 Office Action issued in U.S. Appl. No. 13/635,762.

* cited by examiner

F I G . 3
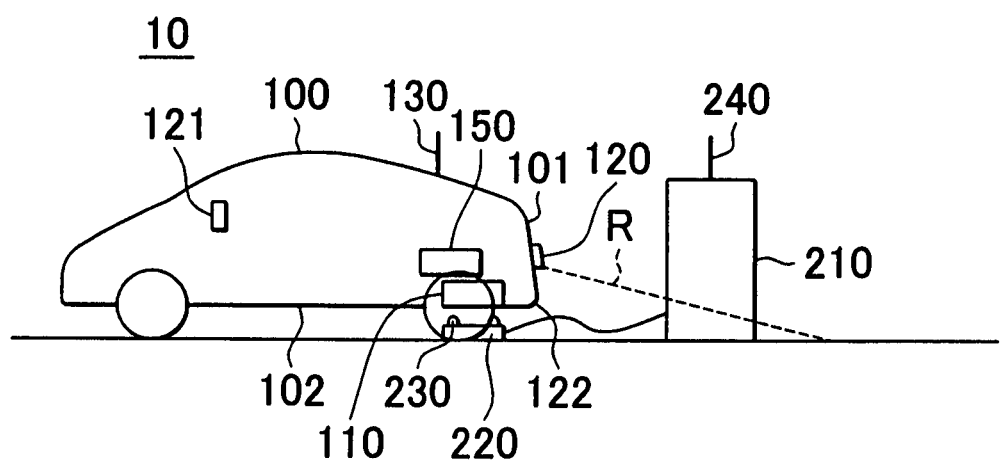

F I G . 20
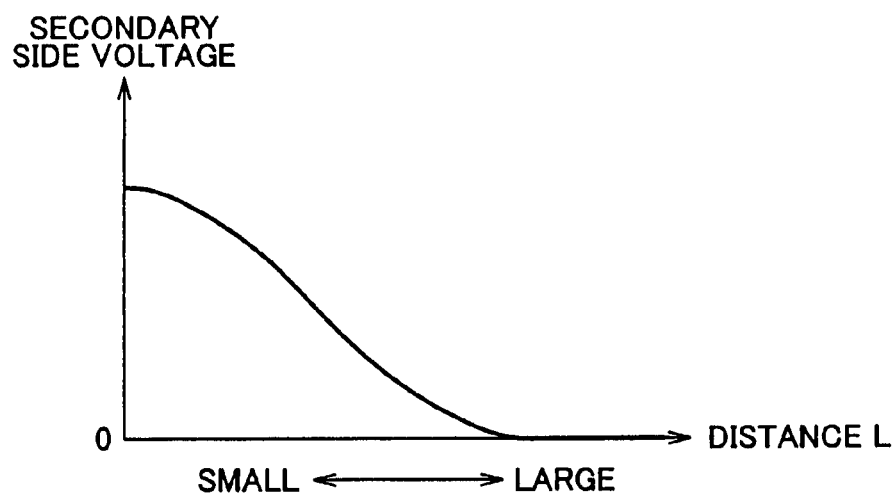
F I G . 21
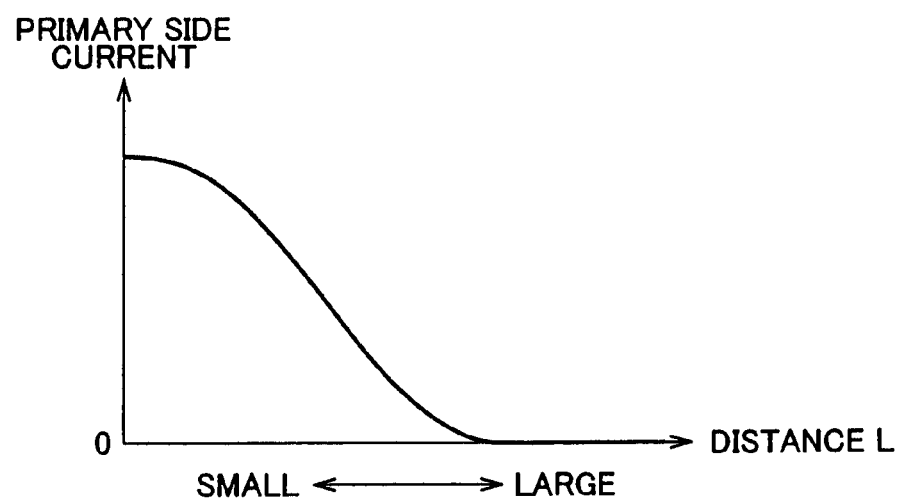

INDUCTIVELY CHARGED VEHICLE WITH AUTOMATIC POSITIONING

BACKGROUND OF THE INVENTION

1. Field of the Invention

The invention relates to a vehicle and in particular to a vehicle that receives electric power, in a non-contact manner, from an electric power transmitting coil provided externally to the vehicle.

2. Description of the Related Art

Various charging systems, such as a charging system that wirelessly charges a battery mounted on a vehicle, have been proposed.

In Japanese Patent Application Publication No. 2004-229425 (JP-A-2004-229425), a vehicle parking system is described that charges a battery mounted on a vehicle with the use of radio waves, such as microwaves.

In this vehicle parking system, an energy supply facility installed at a parking lot, or car park, or an energy station, transmits microwaves to the vehicle while the vehicle is parked. A microwave generator generates microwaves that are higher in intensity than the microwaves that is supplied to the vehicle while the vehicle is running. The vehicle receives microwaves and converts the microwaves to electric energy to charge a battery.

Japanese Patent Application Publication No. 2007-97345 (JP-A-2007-97345) describes a parking assist system that is used to charge a battery mounted on a vehicle. The vehicle assist system includes: a display portion that displays an image viewed from the vehicle; an image capturing device that captures the image viewed from the vehicle; an input portion that receives the target parking position of the vehicle; and a control portion that calculates the path according to the target parking position to perform parking assist control. When an indicator that indicates the position of a facility-side electric power exchange portion is present near the target parking position, the control portion recognizes the position of the indicator and performs control to align a vehicle-side electric power exchange portion installed in the vehicle and the facility-side electric power exchange portion.

Japanese Patent Application Publication No. 9-102329 (JP-A-9-102329) describes a charging system that charges an electric vehicle. The charging system includes a primary coil that is provided on the parking lot side, a secondary coil that is provided on the electric vehicle side, and a vehicle position detecting means for detecting whether the primary coil and the secondary coil are positioned so that these coils can be magnetically coupled to each other. In addition, this charging system further includes a charging control circuit that excites the primary coil by a charging power supply when the vehicle position detecting means detects that the electric vehicle is positioned at a proper position.

The electric vehicle described in Japanese Patent Application Publication No. 2009-106136 (JP-A-2009-106136) receives charging electric power wirelessly from a power source provided externally to the vehicle and charges a charging device mounted on the vehicle.

In order to charge the battery mounted on the vehicle, it is necessary to align the coil mounted on the vehicle and the coil provided on the charging facility side. Meanwhile, a vehicle equipped with a camera that captures an image near the vehicle when the vehicle is backed, and a display unit that displays the image captured by the camera, is already available.

Thus, a method is conceivable, in which when a coil mounted on a vehicle and a coil provided for a charging facility are aligned, the alignment of the coil installed in the vehicle and the coil provided for the charging facility is performed while viewing the coil provided for the charging facility via a camera.

When the coil mounted on the vehicle is disposed at the bottom of the vehicle, however, it is difficult to view the coil mounted on the vehicle on the display unit via the camera that is provided on a side face of the vehicle.

In addition, when the coil mounted on the vehicle is disposed at the bottom of the vehicle, the coil on the charging facility side also becomes positioned under the vehicle when the coils are aligned.

Thus, mounting a camera on a vehicle does not necessarily facilitate the alignment of the coil mounted on the vehicle and the coil on the charging facility side.

Note that the above conventional vehicle parking system or the like has no device that facilitates the alignment of the coil mounted on the vehicle and the coil on the charging facility side when the coil mounted on the vehicle is disposed at the bottom of the vehicle.

SUMMARY OF THE INVENTION

The invention provides a vehicle, in which an electric power receiving coil that receives electric power from an electric power transmitting coil provided externally to the vehicle is disposed at the bottom of the vehicle, and which vehicle facilitates the alignment of the electric power transmitting coil and the electric power receiving coil.

A vehicle according to an aspect of the invention is a vehicle that receives electric power, in a non-contact manner, from an electric power transmitting coil provided externally to the vehicle. The vehicle includes: an electric power receiving coil that is disposed at a bottom of the vehicle and receives electric power from the electric power transmitting coil via electromagnetic field resonance; an image capturing device that captures an image of an outside viewed from the vehicle; and a display unit that displays an outside view from the vehicle that is captured by the image capturing device. The electric power receiving coil is disposed at a position that is offset toward a peripheral face, on which the image capturing device is disposed, with respect to a center of the bottom in a longitudinal direction of the vehicle.

The image capturing device may be disposed at a back face of the vehicle and the electric power receiving coil may be disposed at the position that is offset toward the back face with respect to the center of the bottom in the longitudinal direction of the vehicle. The vehicle may further include a pair of rear wheels that are spaced apart from each other in a width direction of the vehicle, wherein the electric power receiving coil is disposed between the rear wheels. The vehicle may further include: a hollow bobbin fitted with the electric power receiving coil; and an electrical device disposed inside the bobbin.

The vehicle may further include a first side frame and a second side frame, each extending in the longitudinal direction of the vehicle, that are arranged along the width direction of the vehicle. In this case, the electric power receiving coil is disposed between the first and second side frames. The vehicle may further include a battery mounted in the vehicle. The battery is disposed above the electric power receiving coil. The battery may be disposed so as to, at least partially, overlap the electric power receiving coil when viewed from above. The electric power receiving coil may be disposed so as to be spaced from a side periphery of the vehicle. The electric power receiving coil is positioned at a center of the vehicle in a width direction of the vehicle. The vehicle may further include an engine; and an exhaust pipe connected to the engine, wherein the exhaust pipe is disposed at the bottom and is disposed on one lateral side of the vehicle, and the electric power receiving coil is disposed on the other lateral side of the vehicle. The vehicle may further include a first detecting portion that detects a positional relation between an electric power transmitting unit including the electric power transmitting coil and an electric power receiving unit including the electric power receiving coil; a first guiding control portion that controls the vehicle based on a result of detection by the first detecting portion so that the vehicle is guided to the electric power transmitting unit; a second detecting portion that detects a distance between the electric power transmitting unit and the electric power receiving unit based on a status of power supply from the electric power transmitting unit to the electric power receiving unit; and a second guiding control portion that, when the vehicle is caused to approach the electric power transmitting unit within a predetermined distance of the electric power transmitting unit by the first guiding control portion, controls the vehicle based on a result of detection by the second detecting portion so that the electric power transmitting unit and the electric power receiving unit are aligned.

According to the vehicle of the invention, the alignment of an electric power transmitting coil and an electric power receiving coil is facilitated.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a schematic diagram showing a state where the electric vehicle has been moved and an electric power receiving unit and an electric power transmitting unit face each other;

FIG. 20 is a diagram showing a relation between the distance between the electric power transmitting unit and the electric power receiving unit and secondary side voltage;

FIG. 21 is a diagram showing a relation between the distance between the electric power transmitting unit and the electric power receiving unit and primary side current;

DETAILED DESCRIPTION OF EMBODIMENTS

Figure 1:
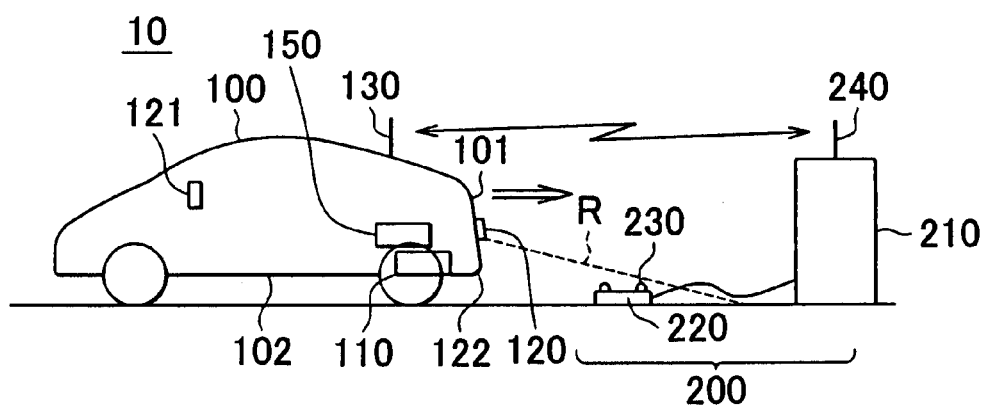
FIG. 1 is an overall configuration diagram of a vehicle power supply system according to an embodiment of the invention.

Embodiments of the invention will be described in detail below with reference to the drawings. Note that the same or corresponding portions in the drawings are designated by the same reference numeral and the description thereof is not repeated.

FIG. 1 is an overall configuration diagram of a vehicle power supply system according to the embodiment of the invention. Referring to FIG. 1, the vehicle power supply system 10 includes an electric vehicle 100 and a power supply facility 200. The electric vehicle 100 includes an electric power receiving unit 110, a camera 120, and a communication unit 130.

The electric power receiving unit 110 is fixed at the bottom of a vehicle body and is configured to receive, in a non-contact manner, electric power sent from an electric power transmitting unit 220 of the power supply facility 200. The electric power receiving unit 110 includes a secondary self-resonant coil and receives, in a non-contact manner, electric power from the electric power transmitting unit 220 by resonating with a primary self-resonant coil included in the electric power transmitting unit 220 via electromagnetic field. The camera 120 is provided to detect the positional relation between the electric power receiving unit 110 and the electric power transmitting unit 220 and is installed on the vehicle body so as to be able to capture an image of a rear view from the vehicle, for example. The communication unit 130 is a communication interface for communication between the electric vehicle 100 and the power supply facility 200.

The electric power receiving unit 110 is disposed at the bottom of the electric vehicle 100 and the camera 120 is disposed at a back face 101 of the electric vehicle 100. The camera 120 captures an image of the outside viewed from the electric vehicle 100. A display unit 121 is provided in the electric vehicle 100 and displays an outside view from the electric vehicle 100 that is captured by the camera 120. The electric power receiving unit 110 is disposed on the back face 101 side with respect to the center of a bottom face 102 of the electric vehicle 100 in the longitudinal direction of the electric vehicle 100. The electric vehicle 100 is equipped with an electricity storage device 150.

The camera 120 is located above the bottom face 102 of the electric vehicle 100 and the electric power receiving unit 110. A rear bumper 122 is provided at a lower part of the back face 101. The camera 120 captures part of the outer peripheral portion of the rear bumper 122 and captures an image of an area to the rear of the electric vehicle 100 from the rear bumper 122.

Note that, although a view area R of the camera 120 is set so as to shift rearward with respect to the electric vehicle 100 in the downward direction from the camera 120, the camera 120 may be disposed so as to be able to capture an image of an area directly below the camera 120.

When the electricity storage device 150 is charged, in order to secure a high charging efficiency, it is necessary to make the electric power receiving unit 110 and the electric power transmitting unit 220 face each other. In the situation shown in FIG. 1, it is required to back the electric vehicle 100.

The driver backs the electric vehicle 100 while viewing the image on the display unit 121 that is captured by the camera 120. In the situation shown in FIG. 1, the electric power transmitting unit 220 is positioned in the view area R of the camera 120 and the display unit 121 shows the electric power transmitting unit 220.

Figure 2:
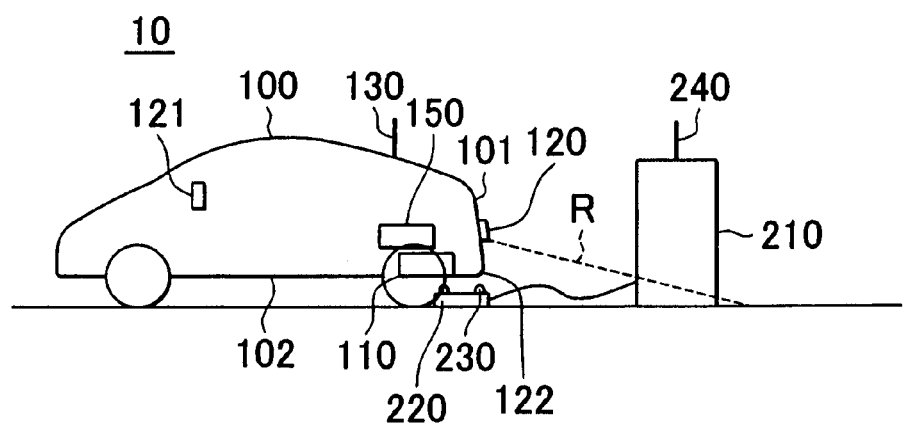
FIG. 2 is a schematic diagram showing a process of movement of an electric vehicle.

The driver moves the electric vehicle 100 so as to make the electric power transmitting unit 220 face the electric power receiving unit 110. FIG. 2 is a schematic diagram showing a process of movement of the electric vehicle 100. FIG. 3 is a schematic diagram showing a state where the electric vehicle 100 has been moved and the electric power receiving unit 110 and the electric power transmitting unit 220 face each other.

As shown in FIG. 2, the electric power transmitting unit 220 becomes positioned under the electric vehicle 100 and out of the view area R in the process of backing the electric vehicle 100 to make the electric power receiving unit 110 and the electric power transmitting unit 220 face each other. When this occurs, the driver becomes unable to view the electric power transmitting unit 220 on the display unit 121. Meanwhile, the electric power receiving unit 110 is located in an area of the bottom face 102 near the back face 101.

Thus, the distance, by which the electric vehicle 100 needs to be backed from when the electric power transmitting unit 220 becomes out of the view area R to when the electric power receiving unit 110 and the electric power transmitting unit 220 face each other, is small.

As a result, as shown in FIG. 3, immediately after the electric power transmitting unit 220 becomes out of the view area R, the electric power transmitting unit 220 and the electric power receiving unit 110 face each other such that a charging operation between the electric power transmitting unit 220 and the electric power receiving unit 110 can be carried out.

Figure 4:
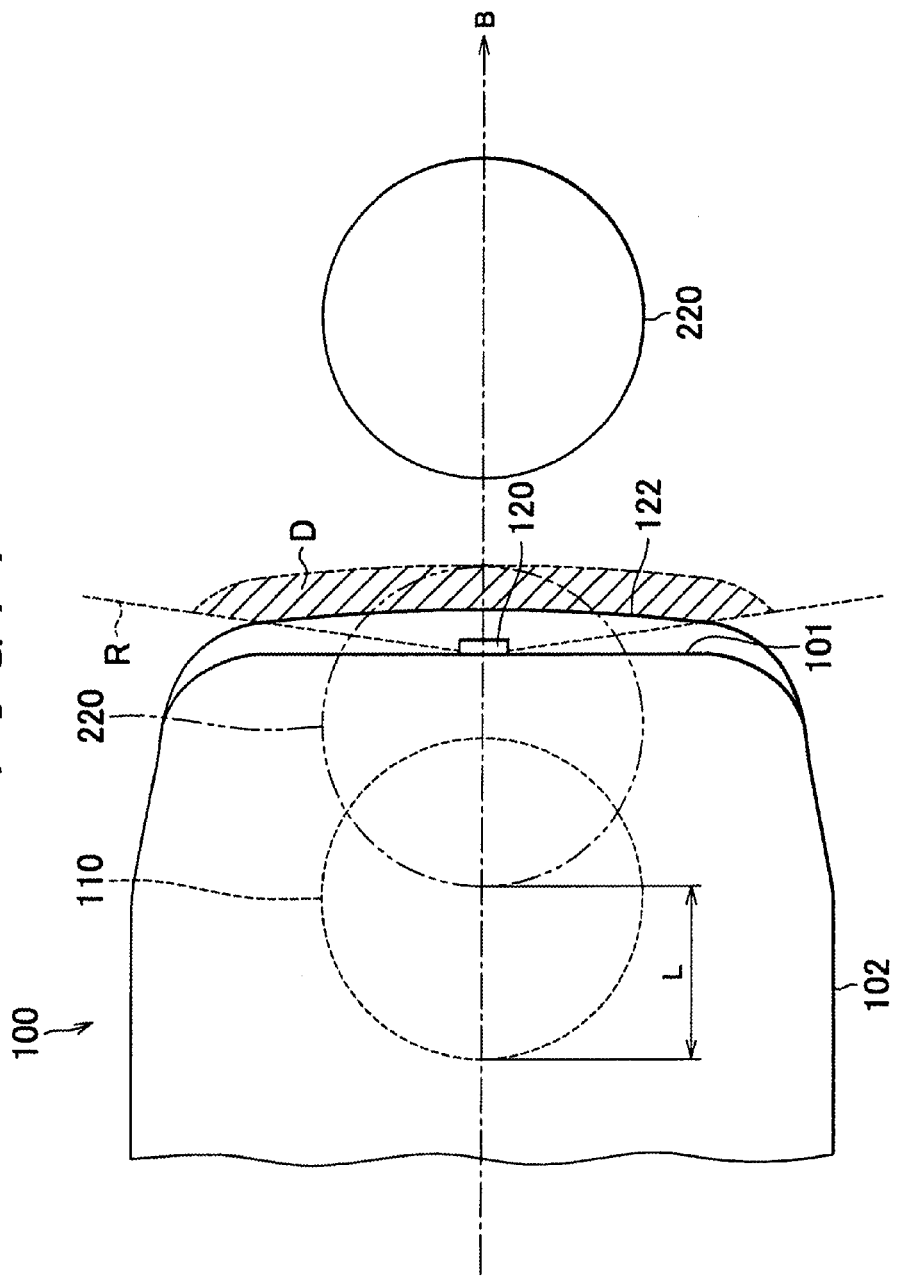
FIG. 4 is a plan view showing a positional relation between the electric power receiving unit and the electric power transmitting unit in the process of moving the electric vehicle.

FIG. 4 is a plan view showing a positional relation between the electric power receiving unit 110 and the electric power transmitting unit 220 in the process of moving the electric vehicle 100.

The character "D" shown in FIG. 4 indicates a blind spot area in the view area R that appears due to the rear bumper 122. The electric power transmitting unit 220 that is expressed by the solid line is positioned in the area that is in the view area R and that is away from the blind spot area D. Thus, the driver or the like can view the electric power transmitting unit 220 on the display unit 121.

Thereafter, when the electric vehicle 100 is backed in a backward direction B, the electric power transmitting unit 220 approaches the blind spot area D. When the electric vehicle 100 is further backed in the backward direction B, the electric power transmitting unit 220 becomes positioned in the blind spot area D and then becomes positioned under the rear bumper 122 and the bottom face 102.

The part of the electric power transmitting unit 220 that has become positioned in the blind spot area D and the part of the electric power transmitting unit 220 that has become positioned under the rear bumper 122 and the bottom face 102 are out of the view area R and cannot be viewed on the display unit 121.

When the electric vehicle 100 is further backed in the backward direction B, as shown by the chain double-dashed line in FIG. 4, the electric power transmitting unit 220 becomes positioned completely in the blind spot area D or in the area under the rear bumper 122 or the bottom face 102 and thus out of the view area R.

The most rear part of the electric power transmitting unit 220 that is expressed by the chain double-dashed line is positioned on the boundary of the blind spot area D. When the electric vehicle 100 is further backed in the backward direction B, the electric power transmitting unit 220 and the electric power receiving unit 110 are aligned along the vertical direction.

Figure 5:
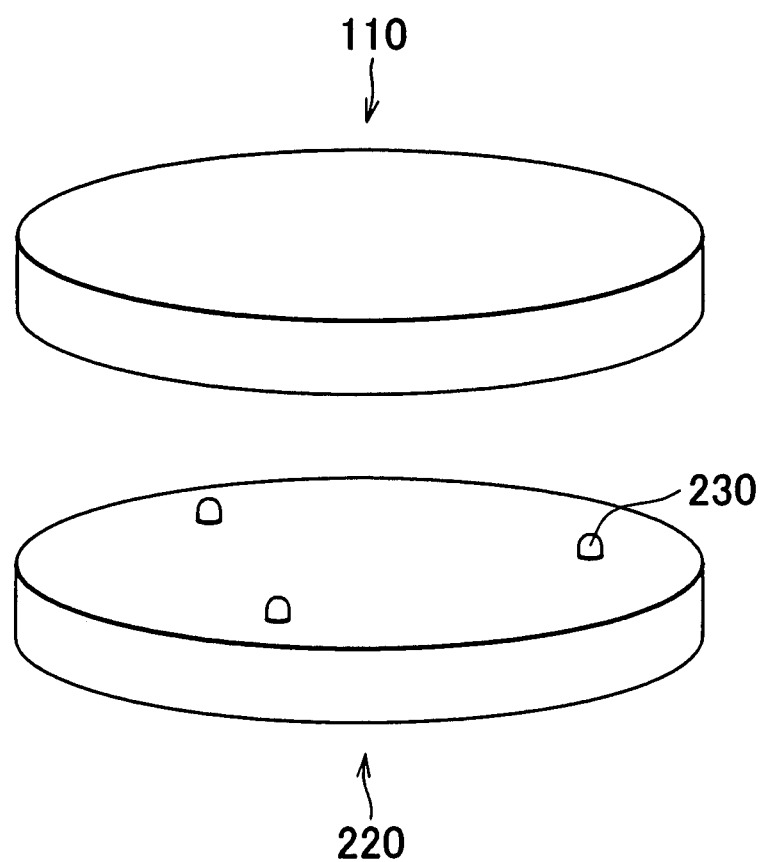
FIG. 5 is a perspective view showing a state where the electric power receiving unit and the electric power transmitting unit face each other.

FIG. 5 is a perspective view showing a state where the electric power receiving unit 110 and the electric power transmitting unit 220 face each other. Electric power is transferred between the primary self-resonant coil housed in the electric power transmitting unit 220 and the secondary self-resonant coil housed in the electric power receiving unit 110 in a state where the electric power receiving unit 110 and the electric power transmitting unit 220 face each other.

In FIG. 4, the distance L, by which the electric vehicle 100 is moved from when the driver becomes unable to view the electric power transmitting unit 220 on the display unit 121 to when the electric power transmitting unit 220 becomes positioned so as to face the electric power receiving unit 110, is small. In particular, as shown by the chain double-dashed line in FIG. 4, part of the electric power transmitting unit 220 and part of the electric power receiving unit 110 face each other when the electric power transmitting unit 220 becomes positioned outside the view area R.

Thus, the driver can make the electric power receiving unit 110 and the electric power transmitting unit 220 face each other by stopping the electric vehicle 100 after a short period of time has elapsed since the electric power transmitting unit 220 disappears from the display unit 121.

Even when the electric power transmitting unit 220 and the electric power receiving unit 110 are misaligned when the electric vehicle 100 is stopped, the amount of misalignment between the electric power transmitting unit 220 and the electric power receiving unit 110 is minimized. Then, it is possible to make the electric power receiving unit 110 and the electric power transmitting unit 220 face each other with accuracy by slightly moving the electric vehicle 100 in the longitudinal direction thereof, so that it is possible to reduce the work load required to make the electric power receiving unit 110 and the electric power transmitting unit 220 face each other.

Figure 6:
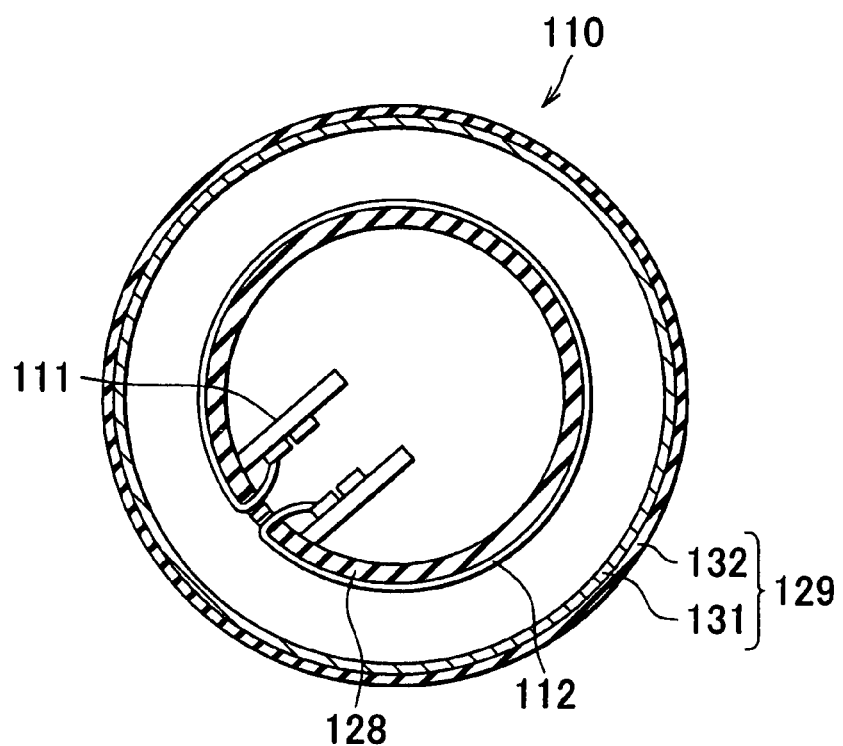
FIG. 6 is a sectional view of the electric power receiving unit.
Figure 7:
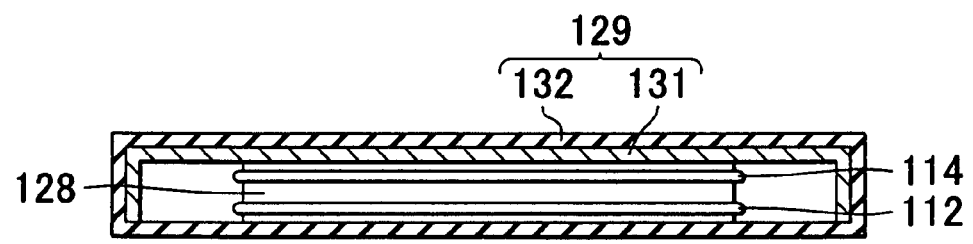
FIG. 7 is a partially sectional side view of the electric power receiving unit.

FIG. 6 is a sectional view of the electric power receiving unit 110. FIG. 7 is a partially sectional side view of the electric power receiving unit 110.

As shown in FIG. 6, the electric power receiving unit 110 includes a case 129, a bobbin 128 disposed in the case 129, and a capacitor 111 disposed in the bobbin 128.

As shown in FIG. 7, the secondary self-resonant coil 112 and a secondary coil 114 are installed on the outer peripheral surface of the bobbin 128.

The secondary coil 114 is disposed on the electric vehicle 100 side with respect to the secondary self-resonant coil 112, and the secondary coil 114 and the secondary self-resonant coil 112 are arranged with a space interposed therebetween in the vertical direction. A capacitor 111 is connected across both ends of the secondary self-resonant coil 112.

The case 129 includes a resin case 132 and a shield 131 formed on the inner face of the resin case 132. The shield 131 is formed so as to cover the inner circumferential surface and the inner top face of the resin case 132 and so as to be open downward. As a material for the shield 131, in general, a material, such as ferrite or permalloy, that contains a high-permeability ferromagnetic is used, for example. On the other hand, as a material for the electric field shield that shields the electric field, in general, a material, such as copper or aluminum, that contains a conductor having a low electric resistance is used.

The shield 131 suppresses the leakage of the electromagnetic field that occurs around the secondary self-resonant coil 112, to the outside of the vehicle and/or into the vehicle. Although, in an example shown in FIG. 7, the resin case 132 has a bottom that closes the opening of the shield 131, the resin case 132 may have an opening at the bottom thereof.

Figure 8:
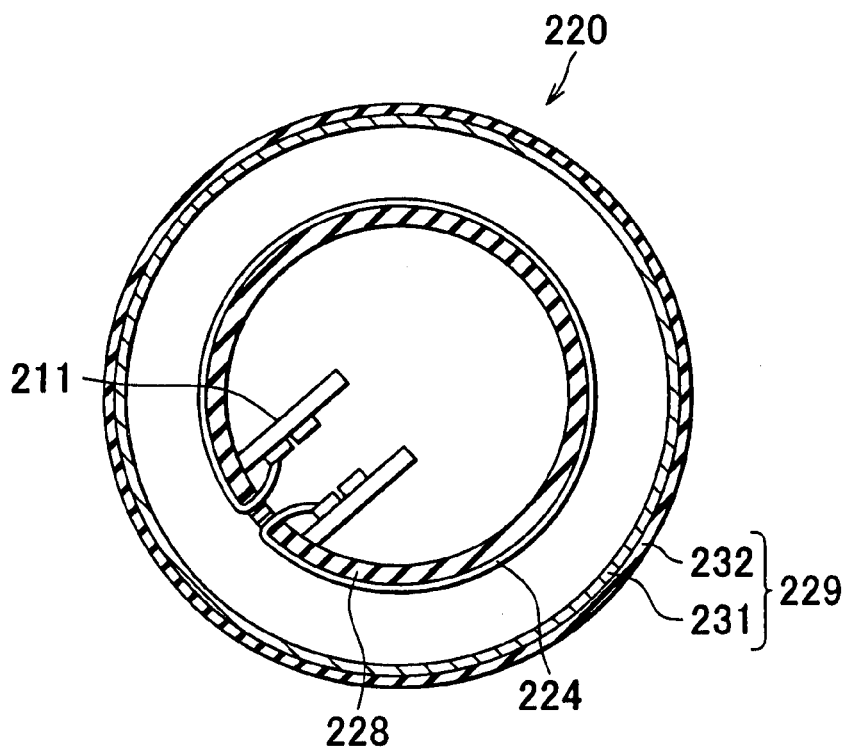
FIG. 8 is a sectional view of the electric power transmitting unit.
Figure 9:
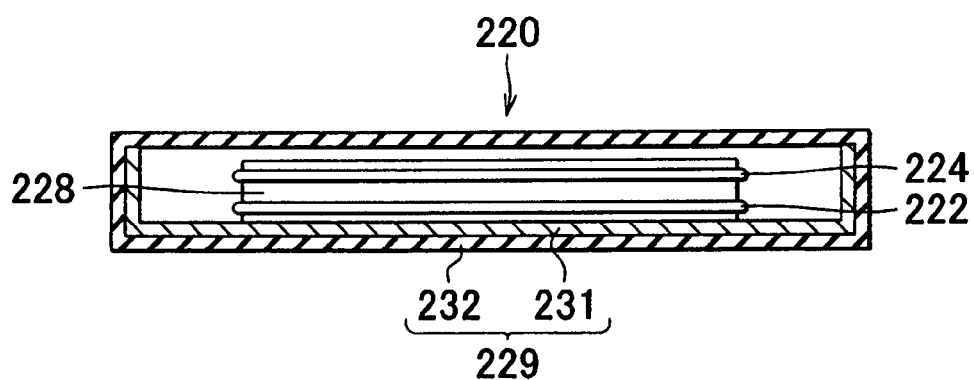
FIG. 9 is a partially sectional side view of the electric power transmitting unit.

The secondary coil 114 is connected, via various devices, to a battery mounted on the electric vehicle 100. FIG. 8 is a sectional view of the electric power transmitting unit 220. FIG. 9 is a partially sectional side view of the electric power transmitting unit 220.

As shown in FIGS. 8 and 9, the electric power transmitting unit 220 also includes a case 229, a cylindrical bobbin 228 disposed in the bobbin 228.

The primary coil 222 and a primary self-resonant coil 224 are installed on the outer peripheral surface of the bobbin 128 with a space interposed between the primary coil 222 and the primary self-resonant coil 224 in the vertical direction, and the primary self-resonant coil 224 is located above the primary coil 222. The case 229 includes a resin case 232 and a shield 231 formed so as to cover the inner circumferential surface and the inner bottom face of the resin case 232. The shield 231 is formed so as to be open upward. A capacitor 211 is connected across both ends of the primary self-resonant coil 224. The primary coil 222 is connected, via various devices, to an external power source.

When electric power is transmitted from the electric power transmitting unit 220 to the electric power receiving unit 110, the electric power is supplied from the external power source to the primary coil 222 and then, the electric power is transmitted from the primary coil 222 to the primary self-resonant coil 224 via electromagnetic induction.

Between the primary self-resonant coil 224 and the secondary self-resonant coil 112 shown in FIG. 7, the electric power is transmitted from the primary self-resonant coil 224 to the secondary self-resonant coil 112 via electromagnetic field resonance. The electric power transmitted to the secondary self-resonant coil 112 is transmitted to the secondary coil 114 via electromagnetic induction. The electric power transmitted to the secondary coil 114 is supplied, via various devices, to the battery mounted on the electric vehicle 100. The outline of the mechanism of the electric power transmission is as described above and the details thereof will be described later.

When the electric power is transmitted from the electric power transmitting unit 220 to the electric power receiving unit 110 in a non-contact manner, an electromagnetic field occurs around the secondary self-resonant coil 112.

Figure 10:
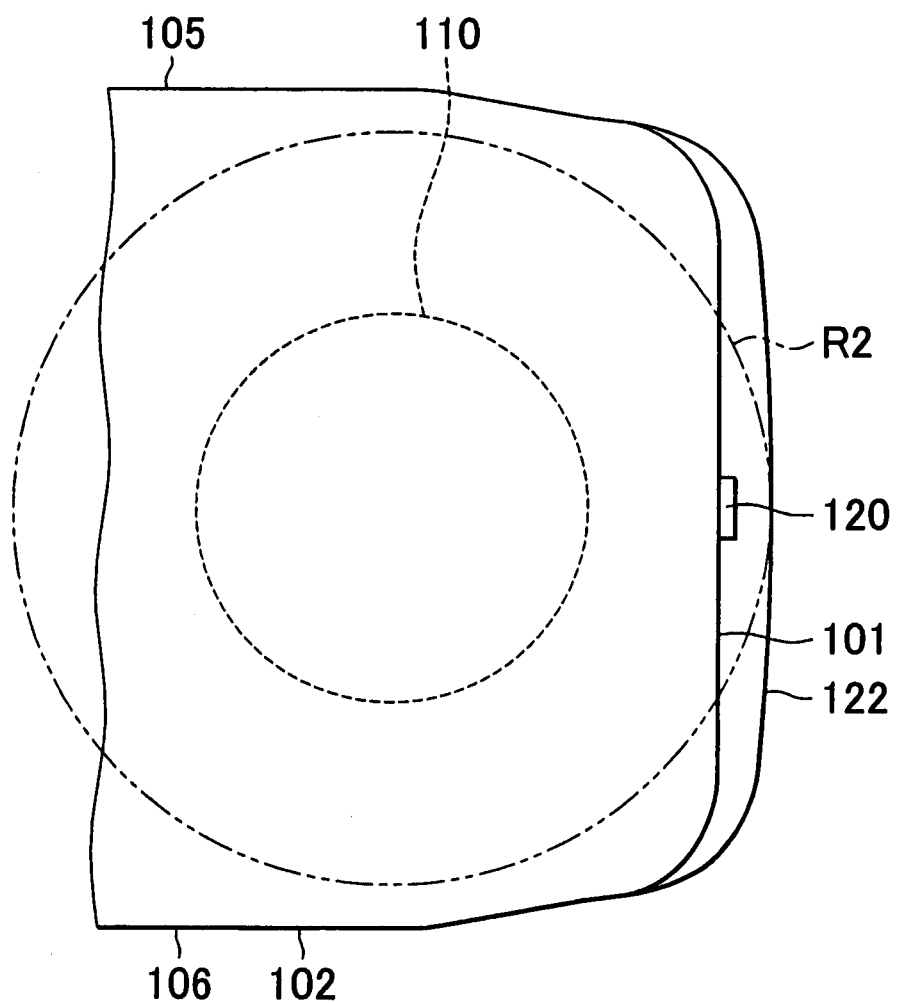
FIG. 10 is a plan view schematically showing a leakage area, in which the electromagnetic field leaks from the electric power receiving unit, the electric power receiving unit, etc.

FIG. 10 is a plan view schematically showing a leakage area, in which the electromagnetic field leaks from the electric power receiving unit 110, the electric power receiving unit 110, etc. In FIG. 10, the characters "R2" indicate the leakage area, in which the electromagnetic field leaks from the electric power receiving unit 110 when the electric power is transmitted from the electric power transmitting unit 220 to the electric power receiving unit 110.

As shown in FIG. 10, the electric power receiving unit 110 is disposed so as to be spaced from the back face 101 and side faces 105 and 106 of the electric vehicle 100. For example, the electric power receiving unit 110 is disposed so as to be spaced from the back face 101 and the side faces 105 and 106 by, for example, 30 cm.

Because the electric power receiving unit 110 is disposed so as to be spaced from the back face 101 and the side faces 105 and 106, the leakage area R2 is positioned in the electric vehicle 100 when the electric vehicle 100 and the electric power receiving unit 110 are viewed from above. Thus, it is possible to suppress the leakage of the electromagnetic field to the outside of the electric vehicle 100 when the electric power is transmitted from the electric power transmitting unit 220 to the electric power receiving unit 110. Specifically, the occurrence of the situation, in which the electromagnetic field leaking from the electric power receiving unit 110 leaks to the outside of the electric vehicle 100 from between the ground and the rear bumper 122 and between the ground and the lower part of the side face 105 and/or the lower part of the side face 106, is suppressed. Thus, it is possible to suppress the influence of the electromagnetic field that leaks from the electric power receiving unit 110, outside the electric vehicle 100.

Figure 11:
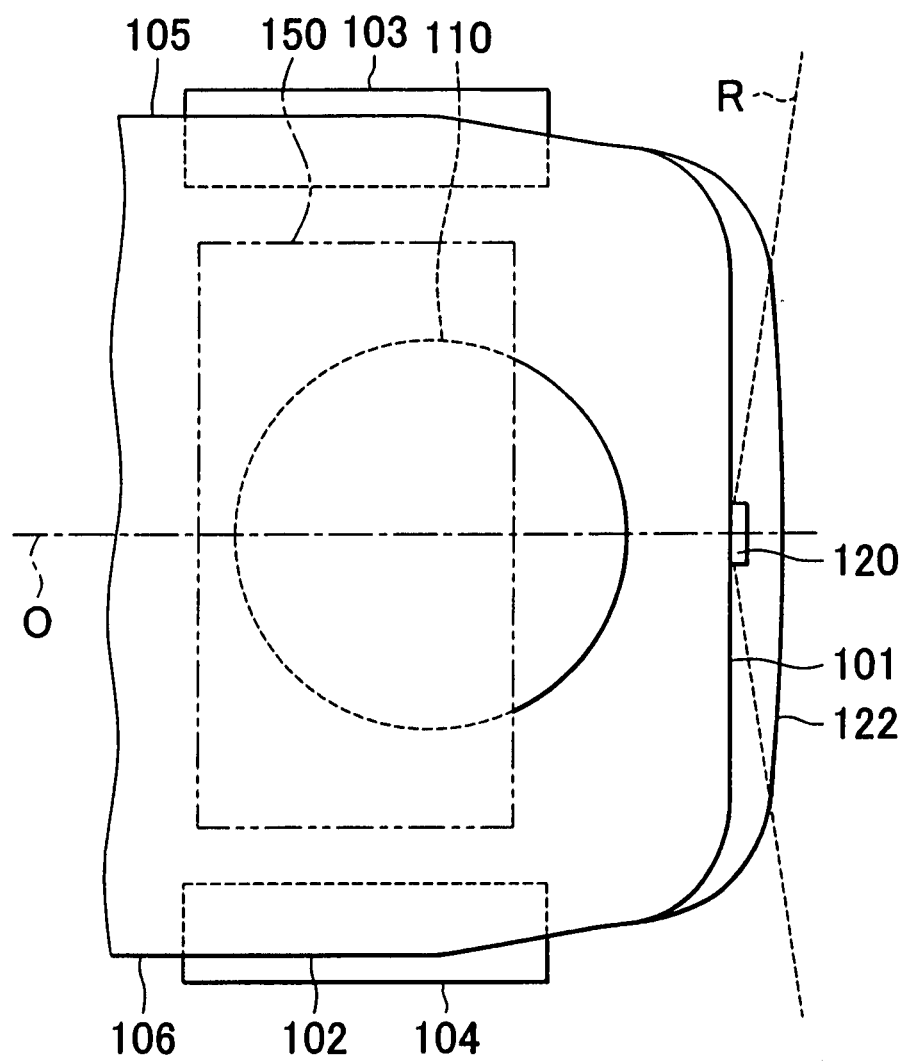
FIG. 11 is a plan view schematically showing a positional relation between pieces of on-board equipment, such as an electricity storage device mounted on the vehicle, the electric power receiving unit, rear wheels, etc.
Figure 12:
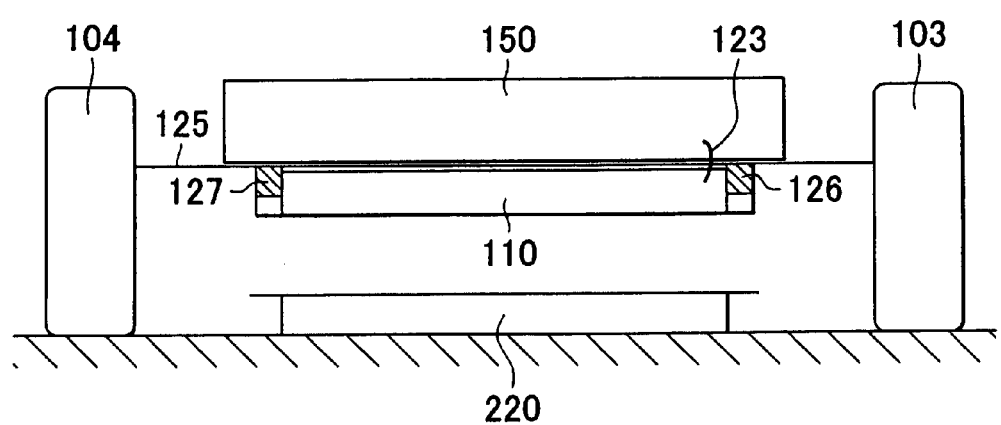
FIG. 12 is a rear view of the electric vehicle schematically showing the positional relation between the electricity storage device, the electric power receiving unit, the rear wheels, etc.

FIG. 11 is a plan view schematically showing the positional relation between pieces of on-board equipment, such as the electricity storage device 150 mounted on the vehicle, the electric power receiving unit 110, rear wheels 103 and 104, etc. FIG. 12 is a rear view of the electric vehicle 100 schematically showing the positional relation between the electricity storage device 150, the electric power receiving unit 110, the rear wheels 103 and 104, etc.

As shown in FIGS. 11 and 12, the electric vehicle 100 includes the rear wheels 103 and 104 that are arranged along the width direction of the electric vehicle 100. The rear wheel 103 is disposed on the side face 105 side and the rear wheel 104 is disposed on the side face 106 side. The electric power receiving unit 110 is disposed between the rear wheels 103 and 104 and protected by the rear wheels 103 and 104 when there is a side impact with another vehicle or the like.

In addition, as shown in FIG. 6, the electric power receiving unit 110 has electrical devices, such as the capacitor 11, and these electrical devices are also protected.

In FIG. 12, the electric vehicle 100 includes a floor panel 125, on the lower surface of which frames 126 and 127 are provided that are spaced apart in the width direction of the vehicle. Specifically, the frames 126 and 127 are rear floor members and formed so as to extend in the longitudinal direction of the electric vehicle 100.

The electric power receiving unit 110 is fixed on the lower surface of the floor panel 125 and disposed between the frames 126 and 127. Thus, the electric power receiving unit 110 is protected when there is a side impact with another vehicle or the like.

There is no difference between the height of the electric power receiving unit 110 and the height of the frames 126 and 127, so that the side face of the electric power receiving unit 110 is covered by the frames 126 and 127. Thus, even when a stone on the road or the like is flung by the tire while the electric vehicle 100 is running, it is possible to reduce the possibility that the flung stone or the like hits the electric power receiving unit 110.

The electricity storage device 150 is disposed on the upper surface of the floor panel 125. The electricity storage device 150 is positioned above the electric power receiving unit 110. As shown in FIG. 11, when viewed from above, the electric power receiving unit 110 and the electricity storage device 150 are disposed so as to, at least partially, overlap each other.

Because the electricity storage device 150 is disposed directly above the electric power receiving unit 110, it is possible to reduce the length of the cable 123 that connects between the electric power receiving unit 110 and the electricity storage device 150. By reducing the length of the cable 123, it is possible to reduce the electrical loss in the cable 123 and improve the charging efficiency.

In an example shown in FIG. 12, the electric power receiving unit 110 is disposed at the center of the vehicle in the width direction thereof. Thus, when the alignment of the electric power receiving unit 110 and the electric power transmitting unit 220 is performed, the driver backs the electric vehicle 100 so that the electric power transmitting unit 220 is positioned to be aligned with the center of the electric vehicle 100 in the width direction thereof while viewing the display unit 121. In this way, it is possible to suppress the misalignment of the electric power receiving unit 110 and the electric power transmitting unit 220 in the width direction of the vehicle.

Figure 13:
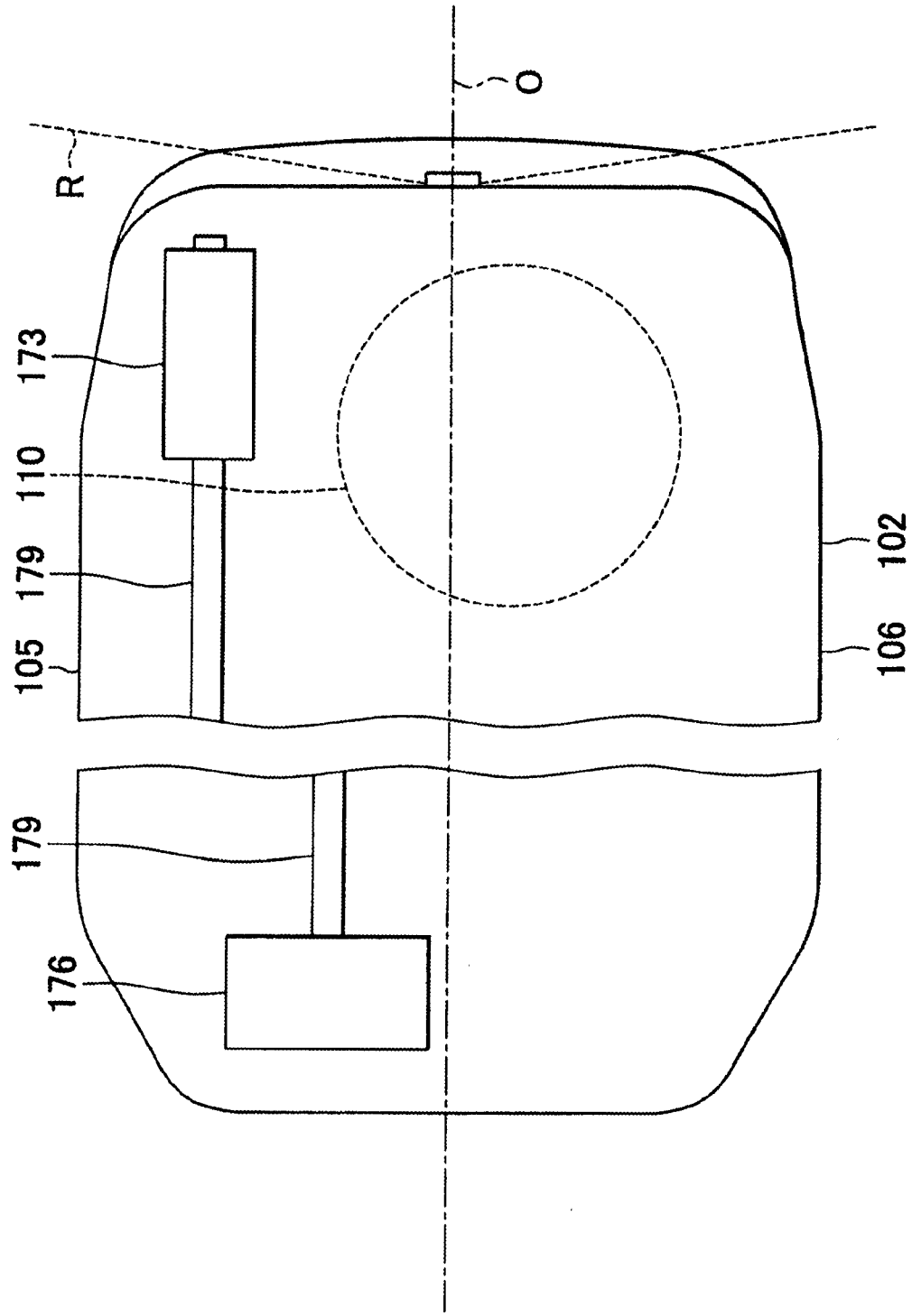
FIG. 13 is a plan view showing a first modification concerning the position at which the electric power receiving unit is mounted.

FIG. 13 is a plan view showing a first modification concerning the position at which the electric power receiving unit 110 is mounted. As shown in FIG. 13, the electric vehicle 100 includes an engine 176, which is installed in an engine compartment formed in the front of the vehicle.

An exhaust pipe 179 is connected to the engine 176 and extends toward the rear of the vehicle. A muffler, or silencer, 173 is connected to the rear end of the exhaust pipe 179. The rear end of the exhaust pipe 179 and the muffler 173 are positioned offset to the side face 105 side with respect to the center of the vehicle in the width direction thereof.

On the other hand, the electric power receiving unit 110 is disposed so that the center of the electric power receiving unit 110 in the width direction of the vehicle is offset to the side face 106 side with respect to the center of the electric vehicle 100 in the width direction thereof. Because the muffler 173 and the exhaust pipe 179 are disposed on the side face 105 side and the electric power receiving unit 110 is disposed on the side face 106 side, the heat is difficult to be transferred from the muffler 173 and the exhaust pipe 179 to the electric power receiving unit 110. In particular, it is preferable that the electric power receiving unit 110 be disposed offset to the side face 106 side between the frames 126 and 127 shown in FIG. 12.

Figure 14:
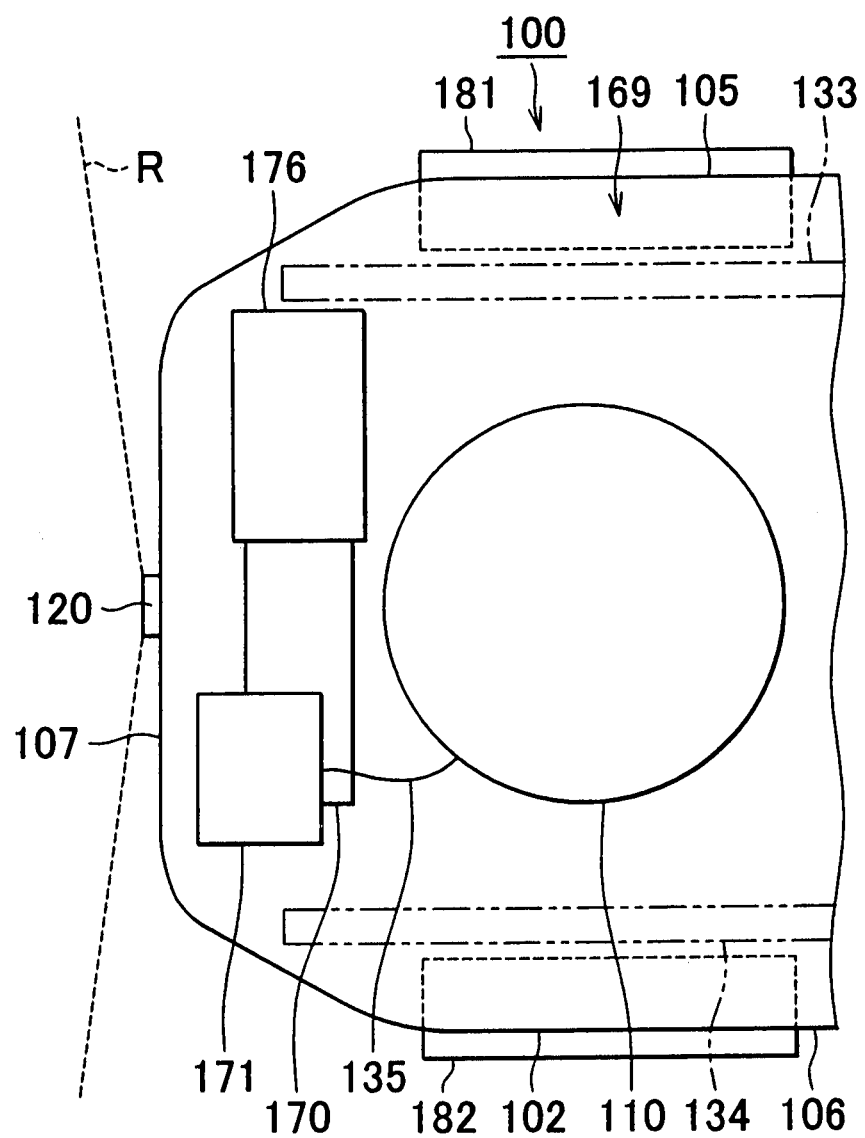
FIG. 14 is a plan view showing a modification concerning the positions, at which the electric power receiving unit and a camera are mounted.

FIG. 14 is a plan view showing a modification concerning the positions, at which the electric power receiving unit 110 and the camera 120 are mounted. In the example shown in FIG. 14, the electric vehicle 100 includes a front face 107 and the engine compartment 169, in which various pieces of equipment are housed.

The electric power receiving unit 110 is disposed offset to the front face 107 side with respect to the center of the electric vehicle 100 in the longitudinal direction (fore-and-aft direction). Thus, it is possible to minimize the distance between the position of the electric power transmitting unit 220 at the time that the electric power transmitting unit 220 becomes positioned under the electric vehicle 100 and it therefore becomes impossible to view the electric power transmitting unit 220 via the camera 120 and the position of the electric power transmitting unit 220 at the time that the electric power receiving unit 110 and the electric power transmitting unit 220 face each other.

Thus, the example shown in FIG. 14 also makes it possible to reduce the work load required to make the electric power receiving unit 110 and the electric power transmitting unit 220 face each other. The electric vehicle 100 includes a driving wheel (front wheel) 181 and a driving wheel (front wheel) 182 that are arranged along the width direction of the electric vehicle 100.

The electric power receiving unit 110 is disposed between the driving wheels 181 and 182. Thus, the electric power receiving unit 110 is protected when there is a side impact with another vehicle or the like.

The electric vehicle 100 includes a side member 133 and a side member 134 that are arranged along the width direction of the electric vehicle 100, and the electric power receiving unit 110 is disposed between the side members 133 and 134. Thus, the electric power receiving unit 110 is protected when there is a side impact with another vehicle or the like.

When the electric vehicle 100 is viewed from above, the electric power receiving unit 110 is positioned within the area of the engine compartment 169. Installed in the engine compartment 169 are a transaxle 170, a power control unit (PCU) case 171, and the engine 176.

In the example shown in FIG. 14, the electric power receiving unit 110 and the PCU case 171 are connected by the cable 135.

Specifically, an inverter is installed in the PCU case 171, and the cable 135 connects between the inverter and the secondary coil 114 in the electric power receiving unit 110. The inverter converts the alternating current (AC current) supplied from the secondary coil 114 to a direct current (DC current) to charge the electricity storage device 150.

Because both the electric power receiving unit 110 and the PCU case 171 are installed in the engine compartment 169, it is possible to minimize the length of the cable 123. Thus, it is possible to reduce the electrical loss in the cable 135 and improve the charging efficiency.

The vehicle charging system for charging the electric vehicle 100 with the use of the power supply facility 200 and the charging mechanism will be described with reference to FIGS. 1 and 15 to 24B. Note that although the alignment of the electric power receiving unit 110 and the electric power transmitting unit 220 is performed through the operation by the driver in the example described above, the alignment of the electric power receiving unit 110 and the electric power transmitting unit 220 may be performed by guiding control as described below.

Referring to FIG. 1, the vehicle power supply system 10 includes the electric vehicle 100 and the power supply facility 200. The electric vehicle 100 includes the electric power receiving unit 110, the camera 120, and the communication unit 130. The communication unit 130 is a communication interface for communication between the electric vehicle 100 and the power supply facility 200.

The power supply facility 200 includes a power supply device 210, the electric power transmitting unit 220, a luminous portion 230, and a communication unit 240. The power supply device 210 converts commercial AC power supplied from the system power supply into a high-frequency electric power and outputs the high-frequency electric power to the electric power transmitting unit 220. The frequency of the high-frequency AC power generated by the power supply device 210 is, for example, one megahertz to a dozen or so megahertz.

The electric power transmitting unit 220 is fixed on a floor of a parking lot, or car park, and is configured to transmit, to the electric power receiving unit 110 of the electric vehicle 100 in a non-contact manner, the high-frequency AC power supplied from the power supply device 210. A plurality of the luminous portions 230 are provided on the electric power transmitting unit 220 so as to indicate the position of the electric power transmitting unit 220. Examples of the luminous portion 230 include light emitting diodes (LEDs). The communication unit 240 is a communication interface for communication between the power supply facility 200 and the electric vehicle 100.

When the electric power is supplied from the power supply facility 200 to the electric vehicle 100, it is necessary to align the electric power receiving unit 110 of the electric vehicle 100 and the electric power transmitting unit 220 of the power supply facility 200 by guiding the electric vehicle 100 to the power supply facility 200. In the example shown in FIGS. 15 to 24B, the parking control, in which the electric vehicle 100 is guided to the power supply facility 200, is performed in two steps.

In the first step, the positional relationship between the electric power receiving unit 110 of the electric vehicle 100 and the electric power transmitting unit 220 of the power supply facility 200 is detected based on the image captured by the camera 120, and the vehicle is controlled, based on the detection result, so that the electric vehicle 100 is guided to the electric power transmitting unit 220. More specifically, the plurality of luminous portions 230 provided on the electric power transmitting unit 220 are captured by the camera 120 and the positions and the orientations of the plurality of luminous portions 230 are recognized by image recognition. Then, based on the result of the image recognition, the relative position and orientation between the electric power transmitting unit 220 and the vehicle are recognized and the vehicle is guided to the electric power transmitting unit 220 based on the result of recognition.

The area in which the electric power receiving unit 110 and the electric power transmitting unit 220 face each other is smaller than the area of the bottom surface of the vehicle body. When the electric power transmitting unit 220 becomes positioned under the vehicle body and it becomes impossible to capture the image of the electric power transmitting unit 220 via the camera 120, the parking control switches from the first step to the second step. In the second step, electric power is supplied from the electric power transmitting unit 220 to the electric power receiving unit 110 and the distance between the electric power transmitting unit 220 and the electric power receiving unit 110 is detected based on the power supply status. Based on this distance information, the vehicle is controlled so that the electric power transmitting unit 220 and the electric power receiving unit 110 are aligned with each other.

The magnitude of the electric power transmitted from the electric power transmitting unit 220 in the second step is set smaller than the electric power that is supplied from the electric power transmitting unit 220 to the electric power receiving unit 110 after the completion of the alignment of the electric power transmitting unit 220 with the electric power receiving unit 110. The reason why the electric power is transmitted from the electric power transmitting unit 220 in the second step is to detect the distance between the electric power transmitting unit 220 and the electric power receiving unit 110 and for this purpose, a high electric power to be used when the main power supply operation is performed is not needed.

Next, a non-contact power supply method used in the vehicle power supply system 10 according to this embodiment will be described. In the vehicle power supply system 10 according to this embodiment, electric power is supplied from the power supply facility 200 to the electric vehicle 100 by the resonance method.

Figure 15:
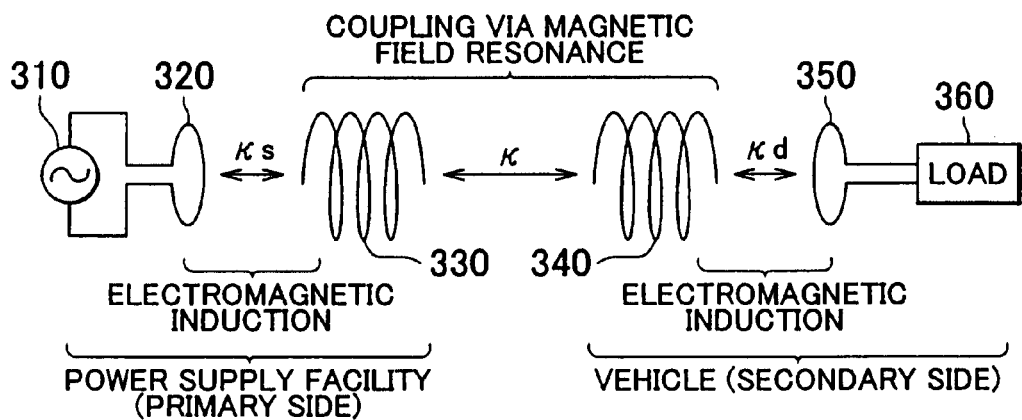
FIG. 15 is a diagram for explaining the principle of electric power transmission using the resonance method.

FIG. 15 is a diagram for explaining the principle of electric power transmission using the resonance method. Referring to FIG. 15, in the resonance method, as in the case of the resonance of two tuning forks, electric power is transmitted from one coil to the other coil via electromagnetic field due to the resonance of two LC resonant coils having the same eigenfrequency in the electromagnetic field (near field).

Specifically, a primary coil 320 is connected to a high-frequency AC power supply 310 and the high-frequency AC power of one megahertz to a dozen or so megahertz is supplied, via electromagnetic induction, to a primary self-resonant coil 330 that is magnetically coupled to the primary coil 320. The primary self-resonant coil 330 is an LC resonator using the inductance of the coil itself and the stray capacitance and the primary self-resonant coil 330 resonates with a secondary self-resonant coil 340 having the resonance frequency the same as that of the primary self-resonant coil 330 via electromagnetic field (near field). As a result, energy (electric power) is transferred from the primary self-resonant coil 330 to the secondary self-resonant coil 340 via electromagnetic field. The energy (electric power) transferred to the secondary self-resonant coil 340 is received, via electromagnetic induction, by a secondary coil 350 that is magnetically coupled to the secondary self-resonant coil 340, and is then supplied to a load 360. The electric power transmission by the resonance method is performed when the Q factor that indicates the intensity of resonance of the primary self-resonant coil 330 and the secondary self-resonant coil 340 is greater than 100, for example.

With regard to the correspondences between FIG. 1 and FIG. 15, the electric power receiving unit 110 in FIG. 1 corresponds to the secondary self-resonant coil 340 and the secondary coil 350, and the electric power transmitting unit 220 in FIG. 1 corresponds to the primary coil 320 and the primary self-resonant coil 330.

Figure 16:
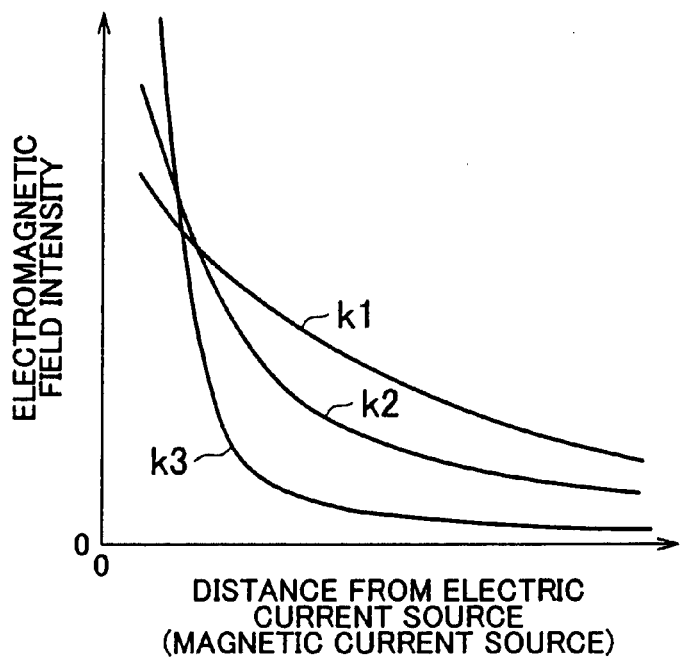
FIG. 16 is a diagram showing relations between the distance from the electric current source (magnetic current source) and the intensity of the electromagnetic field.

FIG. 16 is a diagram showing relations between the distance from the electric current source (magnetic current source) and the intensity of the electromagnetic field. Referring to FIG. 16, the electromagnetic field includes three components. The curve k1 represents a component that is inversely proportional to the distance from the electromagnetic wave source and is called "radiation field". The curve k2 represents a component that is inversely proportional to the square of the distance from the electromagnetic wave source and is called "induction field". The curve k3 represents a component that is inversely proportional to the cube of the distance from the electromagnetic wave source and is called "static field".

These components have the region, in which the intensity of the electromagnetic wave steeply decreases with the distance from the electromagnetic wave source, and this near field (evanescent field) is used to transmit the energy (electric power) in the resonance method. Specifically, with the use of the near field, by causing a pair of resonators (a pair of LC resonant coils, for example) having the same eigenfrequency to resonate with each other, energy (electric power) is transmitted from one resonator (primary self-resonant coil) to the other resonator (secondary self-resonant coil). Because the near field does not transmit energy (electric power) far away, the resonance method can transmit energy with lower energy loss as compared to the case where electromagnetic waves are used that transmit energy (electric power) with the use of the "radiation field" that transmits energy far away.

Figure 17:
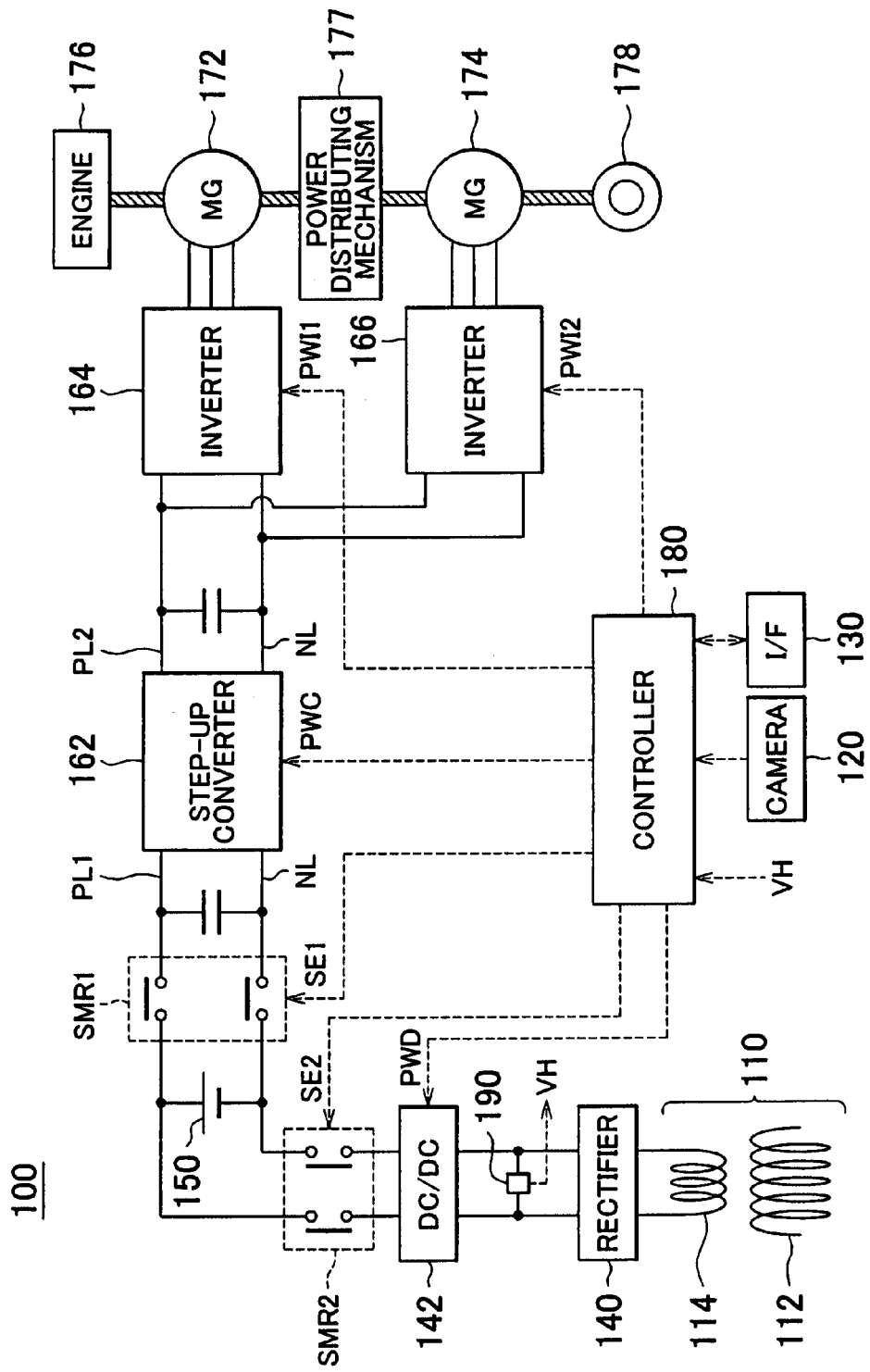
FIG. 17 is a configuration diagram showing details of the electric vehicle shown in FIG. 1.

FIG. 17 is a configuration diagram showing details of the electric vehicle 100 shown in FIG. 1. Referring to FIG. 17, the electric vehicle 100 includes the electricity storage device 150, a system main relay SMR1, a step-up converter 162, inverters 164 and 166, motor generators 172 and 174, the engine 176, a power distributing mechanism 177, and a driving wheel 178. The electric vehicle 100 further includes the secondary self-resonant coil 112, the secondary coil 114, a rectifier 140, a DC/DC converter 142, a system main relay SMR2, and a voltage sensor 190. The electric vehicle 100 further includes a controller 180, the camera 120, and the communication unit 130.

The electric vehicle 100 is equipped with the engine 176 and the motor generator 174 as the motive power sources. The engine 176 and the motor generators 172 and 174 are connected to the power distributing mechanism 177. The electric vehicle 100 is driven by the driving force generated by at least one of the engine 176 and the motor generator 174. The motive power generated by the engine 176 is distributed to two paths by the power distributing mechanism 177. Specifically, one path is the path of power transmission to the driving wheel 178 and the other path is the path of power transmission to the motor generator 172.

The motor generator 172 is an AC rotary electric machine and examples thereof include a three-phase AC synchronous motor, in which permanent magnets are embedded in the rotor. The motor generator 172 generates electricity with the use of the kinetic energy supplied from the engine 176 that is distributed by the power distributing mechanism 177. When the state of charge (SOC) of the electricity storage device 150 falls below a predetermined value, the engine 176 starts and causes the motor generator 172 to generate electricity, thereby charging the electricity storage device 150.

The motor generator 174 is also an AC rotary electric machine and, as in the case of the motor generator 172, examples thereof include a three-phase AC synchronous motor, in which permanent magnets are embedded in the rotor. The motor generator 174 generates the driving force with the use of at least one of the electric power stored in the electricity storage device 150 and the electric power generated by the motor generator 172. The driving force generated by the motor generator 174 is transmitted to the driving wheel 178.

When the vehicle is braked or the acceleration thereof on a downslope is reduced, the mechanical energy stored in the vehicle in the form of the kinetic energy and the potential energy is used to rotate the motor generator 174 via the driving wheel 178 and the motor generator 174 functions as an electric generator. In this way, the motor generator 174 functions as a regenerative brake that generates a braking force by converting the mechanical energy to electric power. The electric power generated by the motor generator 174 is stored in the electricity storage device 150.

The power distributing mechanism 177 includes a planetary gear having a sun gear, pinions, a carrier, and a ring gear. The pinions engage with the sun gear and the ring gear. The carrier rotatably supports the pinions and is connected to the crankshaft of the engine 176. The sun gear is connected to the rotary shaft of the motor generator 172. The ring gear is connected to the rotary shaft of the motor generator 174 and the driving wheel 178.

The electricity storage device 150 is a rechargeable, DC power source and examples thereof include secondary batteries, such as lithium ion batteries and nickel hydrogen batteries. The electricity storage device 150 stores the electric power supplied from the DC/DC converter 142 and stores the electric power that is generated by the motor generators 172 and 174. The electricity storage device 150 supplies the stored electric power to the step-up converter 162. A large-capacitance capacitor can be used as the electricity storage device 150. The electricity storage device 150 is not limited as long as it functions as an electric power buffer that can temporarily store the electric power supplied from the power supply facility 200 (FIG. 1) and the electric power generated by the motor generators 172 and 174 and can supply the stored electric power to the step-up converter 162.

The system main relay SMR1 is placed between the electricity storage device 150 and the step-up converter 162. When a signal SE1 from the controller 180 is activated, the system main relay SMR1 electrically connects the electricity storage device 150 to the step-up converter 162, and when the signal SE1 is deactivated, the system main relay SMR1 disconnects the electric line between the electricity storage device 150 and the step-up converter 162. The step-up converter 162 steps up the voltage of the positive line PL2 to a voltage equal to or higher than the voltage output from the electricity storage device 150, based on a signal PWC from the controller 180. Examples of the step-up converter 162 include a DC chopper circuit. The inverters 164 and 166 are provided for the motor generators 172 and 174, respectively. The inverter 164 drives the motor generator 172 according to a signal PWI1 from the controller 180, and the inverter 166 drives the motor generator 174 according to a signal PWI2 from the controller 180. Examples of the inverters 164 and 166 include three-phase bridge circuits.

The secondary self-resonant coil 112 is an LC resonant coil and receives electric power from the power supply facility 200 by resonating with the primary self-resonant coil of the power supply facility 200 via electromagnetic field. The capacitive component of the secondary self-resonant coil 112 is a capacitor connected across the coil. The number of turns of the secondary self-resonant coil 112 is appropriately set based on the distance between the secondary self-resonant coil 112 and the primary self-resonant coil of the power supply facility 200, the resonance frequency of the primary self-resonant coil and the secondary self-resonant coil 112, etc. so that the Q factor (Q>100, for example) that indicates the intensity of resonance of the primary self-resonant coil and the secondary self-resonant coil 112, kappa that indicates the degree of coupling therebetween, etc. become large.

The secondary coil 114 is disposed coaxially with the secondary self-resonant coil 112 and can be magnetically coupled to the secondary self-resonant coil 112 via electromagnetic induction. The secondary coil 114 receives, via electromagnetic induction, electric power received by the secondary self-resonant coil 112 to output the electric power to the rectifier 140. The secondary self-resonant coil 112 and the secondary coil 114 form the electric power receiving unit 110 shown in FIG. 1.

The rectifier 140 rectifies the AC power received by the secondary coil 114. Based on a signal PWD from the controller 180, the DC/DC converter 142 converts the electric power rectified by the rectifier 140 to a voltage level of the electricity storage device 150 and outputs the electric power to the electricity storage device 150. The system main relay SMR2 is placed between the DC/DC converter 142 and the electricity storage device 150. When a signal SE2 from the controller 180 is activated, the system main relay SMR2 electrically connects the electricity storage device 150 to the DC/DC converter 142, and when the signal SE2 is deactivated, the system main relay SMR2 disconnects the electric line between the electricity storage device 150 and the DC/DC converter 142. The voltage sensor 190 detects a voltage VH between the rectifier 140 and the DC/DC converter 142 and outputs the detected value to the controller 180.

The controller 180 generates the signals PWC, PWI1, and PWI2 for driving the step-up converter 162, and the motor generators 172 and 174, respectively, based on the amount of operation of the accelerator, the vehicle speed, and signals from other various sensors. The controller 180 outputs the generated signals PWC, PWI1, and PWI2 to the step-up converter 162, and the inverters 164 and 166, respectively. When the vehicle is running, the controller 180 activates the signal SE1 to turn on the system main relay SMR1, and deactivates the signal SE2 to turn off the system main relay SMR2.

When electric power is supplied from the power supply facility 200 (FIG. 1) to the electric vehicle 100, the controller 180 receives the image captured by the camera 120 from the camera 120. In addition, the controller 180 receives, from the power supply facility 200 via the communication unit 130, the information on the electric power (voltage and current) output from the power supply facility 200 and receives, from the voltage sensor 190, the detected value of the voltage VH that is detected by the voltage sensor 190. The controller 180 performs parking control of the vehicle by the method to be described later so that the vehicle is guided to the electric power transmitting unit 220 (FIG. 1) of the power supply facility 200, based on these data.

When the parking control for guidance to the electric power transmitting unit 220 is completed, the controller 180 transmits, to the power supply facility 200 via the communication unit 130, an instruction to supply electric power and activates the signal SE2 to turn on the system main relay SMR2. The controller 180 then generates the signal PWD for driving the DC/DC converter 142 and outputs the generated signal PWD to the DC/DC converter 142.

Figure 18:
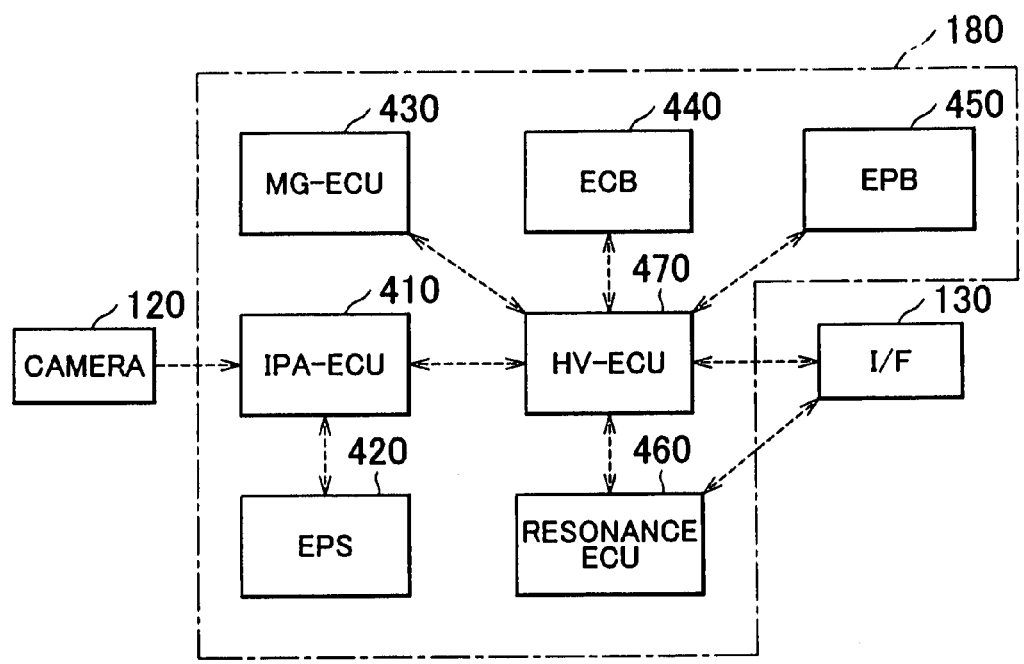
FIG. 18 is a functional block diagram of a controller shown in FIG. 17.

FIG. 18 is a functional block diagram of the controller 180 shown in FIG. 17. Referring to FIG. 18, the controller 180 includes an intelligent parking assist (IPA)-electronic control unit (ECU) 410, an electric power steering (EPS) 420, a motor generator (MG)-ECU 430, an electronically controlled brake (ECB) 440, an electric parking brake (EPB) 450, a resonance ECU 460, and a hybrid vehicle (HV)-ECU 470.

The IPA-ECU 410 performs guiding control to guide the vehicle to the electric power transmitting unit 220 (FIG. 1) of the power supply facility 200 based on the image information received from the camera 120 when the operation mode of the vehicle is the charging mode (first guiding control). Specifically, the IPA-ECU 410 recognizes the electric power transmitting unit 220 based on the image information received from the camera 120. The electric power transmitting unit 220 is provided with the plurality of luminous portions 230 that show the position and orientation of the electric power transmitting unit 220. The IPA-ECU 410 recognizes the positional relation between the vehicle and the electric power transmitting unit 220 (roughly estimated distance and orientation) based on the image of the plurality of luminous portions 230 captured by the camera 120. Based on the result of recognition, the IPA-ECU 410 outputs an instruction to the EPS 420 so as to guide the vehicle to the electric power transmitting unit 220 in a proper direction.

The IPA-ECU 410 provides, to the HV-ECU 470, the notification of end of the guiding control (first guiding control) based on the image information received from the camera 120 when the vehicle approaches the electric power transmitting unit 220 to cause the electric power transmitting unit 220 to be positioned under the vehicle body and it becomes impossible for the camera 120 to capture the electric power transmitting unit 220. The EPS 420 performs automatic control of the steering according to the instructions sent from the IPA-ECU 410 during the first guiding control.

The MG-ECU 430 controls the motor generators 172 and 174, and the step-up converter 162 according to the instructions sent from the HV-ECU 470. Specifically, the MG-ECU 430 generates signals for driving the motor generators 172 and 174 and the step-up converter 162 and outputs the signals to the inverters 164 and 166 and the step-up converter 162.

The ECB 440 controls braking of the vehicle according to the instructions sent from the HV-ECU 470. Specifically, the ECB 440 controls the hydraulic brake according to the instructions sent from the HV-ECU 470, and performs cooperative control of the hydraulic brake and the regenerative brake using the motor generator 174. The EPB 450 controls the electric parking brake according to the instructions sent from the HV-ECU 470.

The resonance ECU 460 receives, from the power supply facility 200 via the communication unit 130, information on the electric power output from the power supply facility 200 (FIG. 1). The resonance ECU 460 receives, from the voltage sensor 190 (FIG. 17), the detected value of the voltage VH indicating the voltage of the electric power received by the vehicle. The resonance ECU 460 detects the distance between the electric power transmitting unit 220 of the power supply facility 200 and the electric power receiving unit 110 of the vehicle by, for example, comparing the voltage VH and the voltage of the electric power transmitted from the power supply facility 200.

Figure 19:
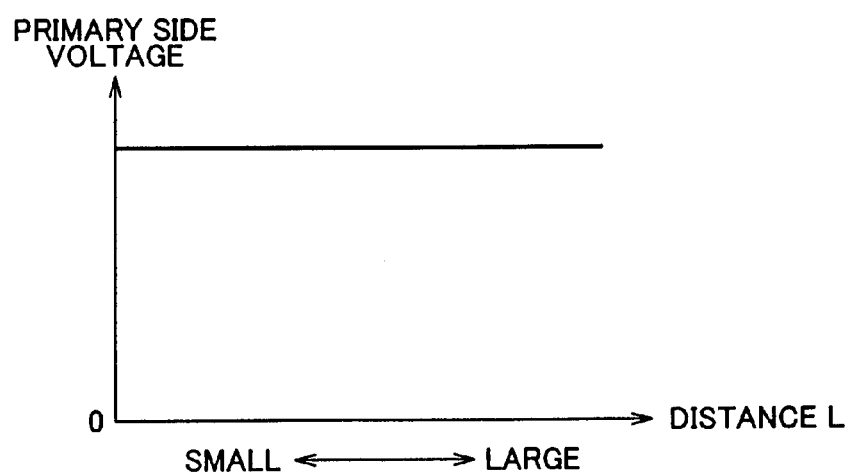
FIG. 19 is a diagram showing a relation between the distance between the electric power transmitting unit and the electric power receiving unit and primary side voltage.

Specifically, while the primary side voltage (voltage output from the power supply facility 200) is constant as shown in FIG. 19, the secondary side voltage (voltage of the electric power received by the electric vehicle 100) varies depending on the distance L between the electric power transmitting unit 220 of the power supply facility 200 and the electric power receiving unit 110 of the electric vehicle 100 as shown in FIG. 20. Thus, it is possible to prepare a map, or the like, by measuring, in advance, the relation between the primary side voltage and the secondary side voltage shown in FIGS. 19 and 20, for example, to detect the distance between the electric power transmitting unit 220 and the electric power receiving unit 110 based on the detected value of the voltage V11 indicating the secondary side voltage.

Note that, as shown in FIG. 21, the primary side current (electric current output from the power supply facility 200) also varies depending on the distance L between the electric power transmitting unit 220 and the electric power receiving unit 110 and therefore, the distance between the electric power transmitting unit 220 and the electric power receiving unit 110 may be detected based on the detected value of the electric current output from the power supply facility 200 with the use of this relation.

Referring again to FIG. 18, when the resonance ECU 460 detects the distance between the electric power transmitting unit 220 and the electric power receiving unit 110, the resonance ECU 460 outputs the distance information to the HV-ECU 470. When the resonance ECU 460 receives the instruction to start charging from the HV-ECU 470, the resonance ECU 460 turns on the system main relay SMR2 by activating the signal SE2 that is output to the system main relay SMR2. The resonance ECU 460 then generates the signal for driving the DC/DC converter 142 and outputs the generated signal to the DC/DC converter 142.

The HV-ECU 470 outputs control instructions to the MG-ECU 430 and the ECB 440 according to the status of operation of the accelerator pedal and/or the brake pedal, the drive status of the vehicle, etc. when the operation mode of the vehicle is the driving mode. When the driver provides the instruction to activate the parking brake by, for example, operating a parking brake switch, the HV-ECU 470 outputs an instruction to operate to the EPB 450.

On the other hand, when the operation mode of the vehicle is the charging mode, the HV-ECU 470 establishes communication with the power supply facility 200 (FIG. 1) via the communication unit 130 and outputs an activation instruction to activate the power supply facility 200 to the power supply facility 200 via the communication unit 130. When the power supply facility 200 is activated, the HV-ECU 470 outputs an instruction to turn on the luminous portions 230 provided on the electric power transmitting unit 220 of the power supply facility 200 to the power supply facility 200 via the communication unit 130. When the luminous portions 230 are turned on, the HV-ECU 470 outputs, to the power supply facility 200 via the communication unit 130, a guiding control indication signal indicating that the guiding control to guide the electric vehicle 100 to the electric power transmitting unit 220 is being performed, and in addition, the HV-ECU 470 outputs, to the WA-ECU 410, an instruction to perform a guiding control (first guiding control) using the image information provided from the camera 120.

In addition, when the HV-ECU 470 receives a notice of end of the first guiding control from the IPA-ECU 410, the HV-ECU 470 performs a guiding control (second guiding control) using the information on the distance between the electric power transmitting unit 220 and the electric power receiving unit 110. Specifically, the HV-ECU 470 receives the information on the distance between the electric power transmitting unit 220 of the power supply facility 200 and the electric power receiving unit 110 of the vehicle from the resonance ECU 460, and based on the distance information, the HV-ECU 470 outputs instructions to the MG-ECU 430 and the ECB 440 that control driving and braking, respectively, of the vehicle so that the distance between the electric power transmitting unit 220 and the electric power receiving unit 110 is minimized.

Figure 22:
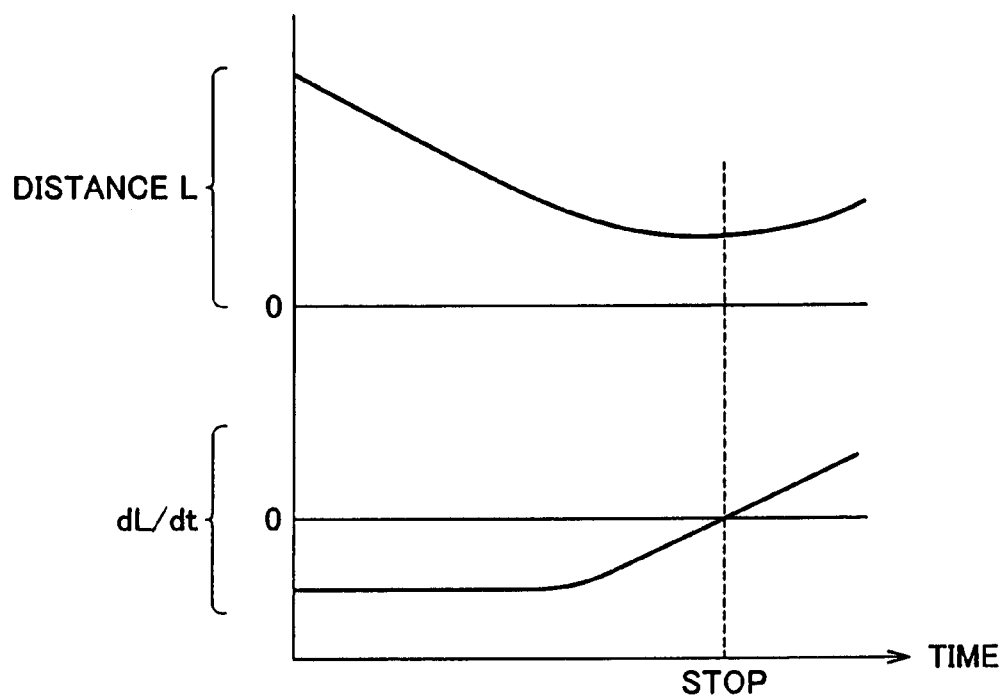
FIG. 22 is a diagram showing variations of the distance between the electric power transmitting unit and the electric power receiving unit and the derivative thereof.

Note that whether the distance between the electric power transmitting unit 220 and the electric power receiving unit 110 is minimized is determined, for example, based on the fact that the derivative of the distance L between the electric power transmitting unit 220 and the electric power receiving unit 110 that is received from the resonance ECU 460 becomes zero as shown in FIG. 22.

Referring again to FIG. 18, when the alignment of the electric power transmitting unit 220 and the electric power receiving unit 110 is completed, the HV-ECU 470 outputs an instruction to operate to the EPB 450 and thereafter, the HV-ECU 470 outputs, to the power supply facility 200 via the communication unit 130, the instruction to start supplying electric power from the power supply facility 200 and outputs the instruction to start charging to the resonance ECU 460.

In the controller 180, when the operation mode of the vehicle becomes the charging mode, the HV-ECU 470 establishes communication with the power supply facility 200 via the communication unit 130 and transmits an activation instruction to activate the power supply facility 200 to the power supply facility 200 via the communication unit 130. When the power supply facility 200 is activated according to the activation instruction, the HV-ECU 470 transmits an instruction to turn on the luminous portions 230 to the power supply facility 200 via the communication unit 130. When the luminous portions 230 on the electric power transmitting unit 220 are turned on, the HV-ECU 470 transmits a guiding control indication signal to the power supply facility 200 via the communication unit 130, and in addition, the HV-ECU 470 outputs, to the IPA-ECU 410, an instruction to perform a guiding control (first guiding control) using the image information provided from the camera 120.

When the IPA-ECU 410 receives an instruction from the HV-ECU 470, the IPA-ECU 410 performs guiding control based on the image information received from the camera 120 (first guiding control) and outputs an instruction to perform automatic control of the steering to the EPS 420. The IPA-ECU 410 provides, to the HV-ECU 470, the notification of end of the first guiding control when the vehicle approaches the electric power transmitting unit 220 to cause the electric power transmitting unit 220 to be positioned under the vehicle body and it becomes impossible to recognize the electric power transmitting unit 220 via the camera 120.

Meanwhile, the resonance ECU 460 receives, from the power supply facility 200 via the communication unit 130, the information on the electric power output from the power supply facility 200 according to the guiding control indication signal (the electric power is lower than the electric power supplied after the parking control is completed as described above), and the resonance ECU 460 receives, from the voltage sensor 190, the detected value of the voltage VH indicating the voltage of the electric power received by the electric vehicle 100. The resonance ECU 460 then estimates the distance between the electric power transmitting unit 220 and the electric power receiving unit 110 based on the status of the power supply from the power supply facility 200 to the electric vehicle 100 and outputs the distance information to the HV-ECU 470. When the HV-ECU 470 receives, from the IPA-ECU 410, a notice of end of the first guiding control performed based on the image information provided from the camera 120, the HV-ECU 470 performs a guiding control (second guiding control) based on the information on the distance between the electric power transmitting unit 220 and the electric power receiving unit 110 received from the resonance ECU 460 and outputs instructions to perform automatic control of driving and braking of the vehicle, to the MG-ECU 430 and the ECB 440.

When the second guiding control completes the alignment of the electric power transmitting unit 220 and the electric power receiving unit 110, the HV-ECU 470 outputs the instruction to operate to the EPB 450 and thereafter, the HV-ECU 470 outputs, to the power supply facility 200 via the communication unit 130, the instruction to start supplying electric power and outputs the instruction to start charging to the resonance ECU 460. In this way, the substantial power supply from the power supply facility 200 to the electric vehicle 100 is started.

Figure 23:
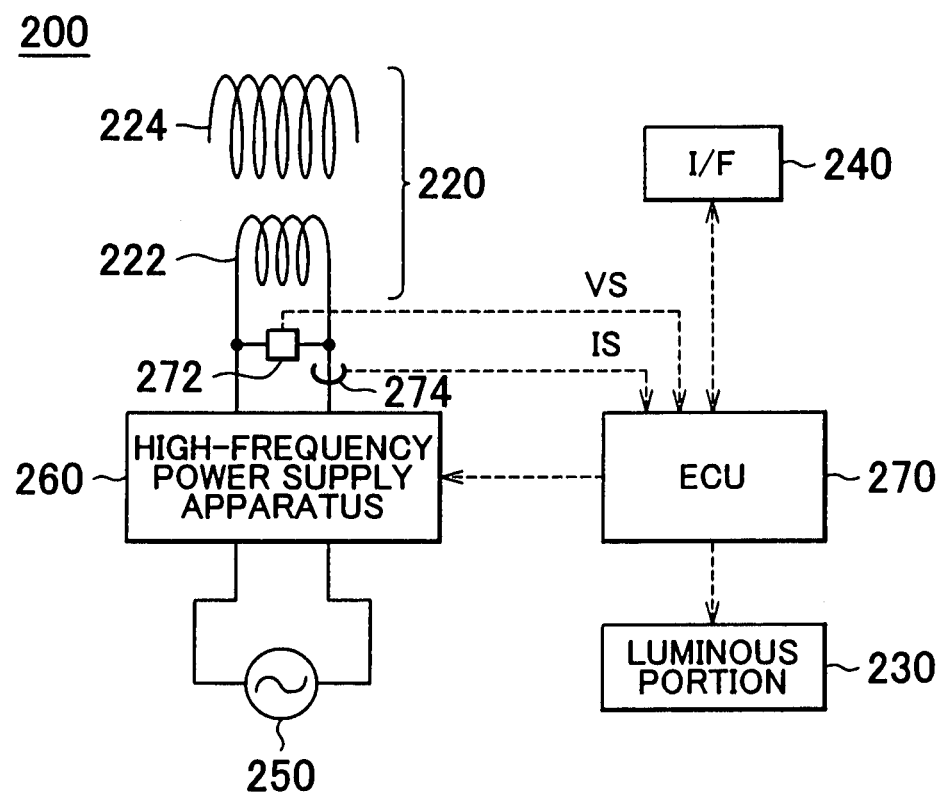
FIG. 23 is a functional block diagram of a power supply facility shown in FIG. 1.

FIG. 23 is a functional block diagram of the power supply facility 200 shown in FIG. 1. Referring to FIG. 23, the power supply facility 200 includes an AC power supply 250, a high-frequency AC power driver 260, the primary coil 222, the primary self-resonant coil 224, a voltage sensor 272, a current sensor 274, the luminous portion 230, the communication unit 240, and an ECU 270.

The AC power supply 250 is a power supply provided externally to the vehicle, which is, for example, a system power supply. The high-frequency AC power driver 260 converts the electric power received from the AC power supply 250 to a high-frequency AC power and supplies the high-frequency AC power to the primary coil 222. The frequency of the high-frequency AC power generated by the high-frequency AC power driver 260 is, for example, one megahertz to a dozen or so megahertz.

The primary coil 222 is provided coaxially with the primary self-resonant coil 224 and can be magnetically coupled to the primary self-resonant coil 224 via electromagnetic induction. The primary coil 222 supplies, to the primary self-resonant coil 224 via electromagnetic induction, the high-frequency AC power supplied from the high-frequency AC power driver 260.

The primary self-resonant coil 224 is an LC resonant coil as in the case of the secondary self-resonant coil 112 of the electric vehicle 100 and transmits electric power to the electric vehicle 100 by resonating with the secondary self-resonant coil 112 of the electric vehicle 100 via electromagnetic field. The capacitive component of the primary self-resonant coil 224 is also a capacitor connected across the coil. The number of turns of the primary self-resonant coil 224 is also appropriately set based on the distance between the primary self-resonant coil 224 and the secondary self-resonant coil 112 of the electric vehicle 100, the resonance frequency of the primary self-resonant coil 224 and the secondary self-resonant coil 112, etc. so that the Q factor (Q>100, for example), the degree of coupling, κ, etc. become large.

The primary self-resonant coil 224 and the primary coil 222 form the electric power transmitting unit 220 shown in FIG. 1. The luminous portion 230 and the communication unit 240 are as described with reference to FIG. 1. The voltage sensor 272 detects a voltage VS output from the high-frequency AC power driver 260 and outputs the detected value to the ECU 270. The current sensor 274 detects an electric current IS output from the high-frequency AC power driver 260 and outputs the detected value to the ECU 270.

When the ECU 270 receives an activation instruction from the electric vehicle 100 via the communication unit 240, the ECU 270 activates the power supply facility 200. When the ECU 270 receives a turn-on instruction to turn on the luminous portion 230 from the electric vehicle 100 via the communication unit 240, the ECU 270 turns on the luminous portion 230. When the ECU 270 receives, from the electric vehicle 100 via the communication unit 240, an instruction to supply electric power, the ECU 270 controls the output of the high-frequency AC power driver 260 so that the electric power supplied from the power supply facility 200 to the electric vehicle 100 becomes equal to a target value.

While the ECU 270 receives the guiding control indication signal from the electric vehicle 100 via the communication unit 240, the ECU 270 transmits, to the electric vehicle 100 via the communication unit 240, the electric power information of the power supply facility 200 that includes the detected value of a voltage VS sent from the voltage sensor 272 and the detected value of an electric current IS sent from the current sensor 274. While the ECU 270 receives the guiding control indication signal, the ECU 270 controls the output of the high-frequency AC power driver 260 so that a predetermined electric power lower than the electric power supplied during a power supply operation according to the instruction to supply electric power is output.

Figure 24A:
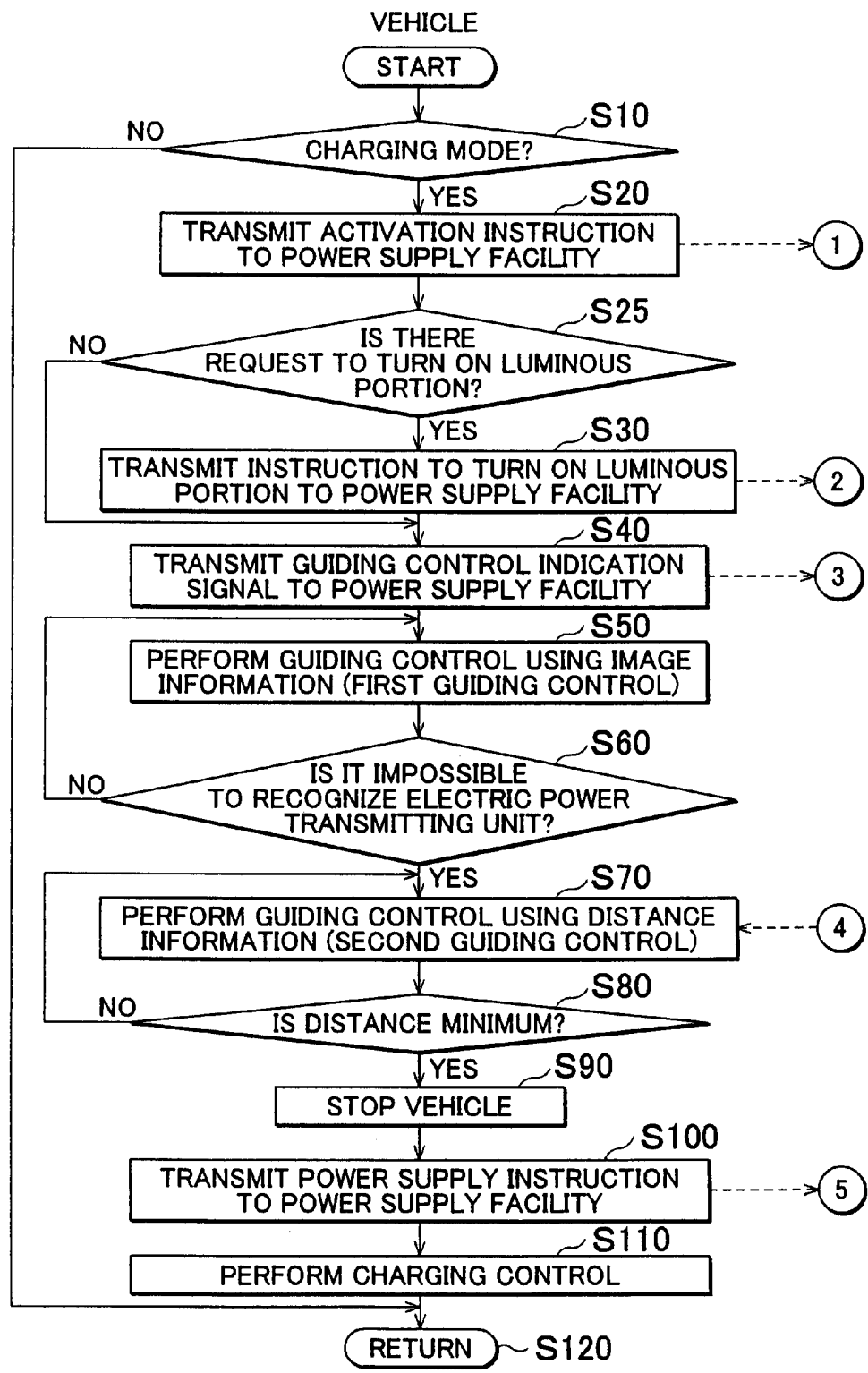
FIGS. 24A and B are flow charts for explaining vehicle guiding control that is performed by the controller of the electric vehicle and an ECU of the power supply facility.
Figure 24B:
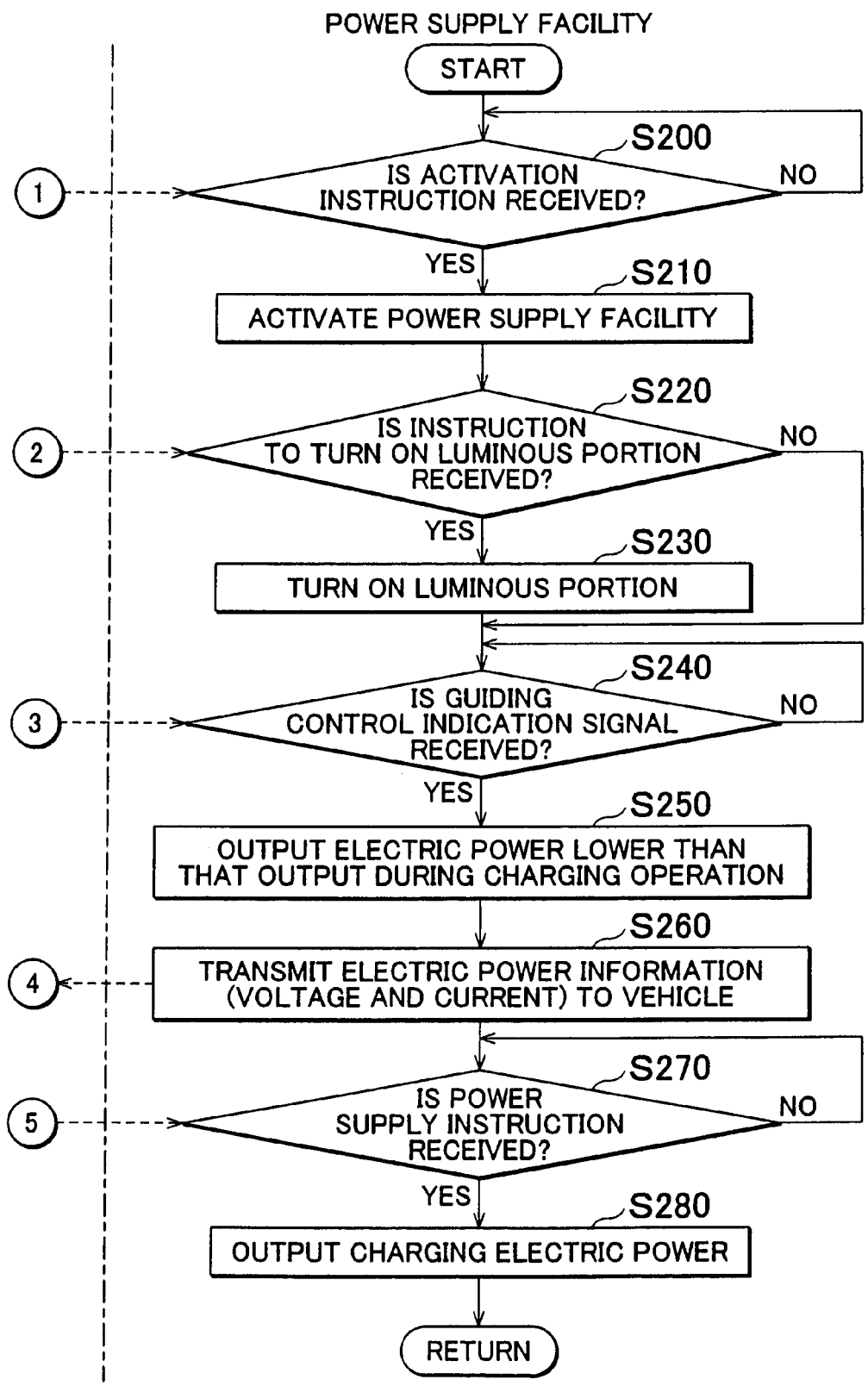

FIGS. 24A and 24B are flow charts for explaining the vehicle guiding control that is performed by the controller 180 of the electric vehicle 100 and the ECU 270 of the power supply facility 200. The process of these flow charts is executed at predetermined intervals or every time a predetermined condition(s) is/are satisfied.

Referring to FIGS. 24A and 24B, in the electric vehicle 100, the controller 180 determines whether the operation mode of the vehicle is the charging mode (step S10). When the operation mode is the non-charging mode, that is, the driving mode (NO in step S10), the controller 180 proceeds to step S120 without executing the subsequent series of steps.

When it is determined in step S10 that the operation mode is the charging mode (YES in step S10), the controller 180 establishes the communication between the communication unit 130 of the vehicle and the communication unit 240 of the power supply facility 200 and transmits the activation instruction to activate the power supply facility 200 to the power supply facility 200 via the communication unit 130 (step S20). Subsequently, when there is a request to turn on the luminous portion 230 provided on the electric power transmitting unit 220 of the power supply facility 200 (YES in step S25), the controller 180 transmits the instruction to turn on the luminous portion 230 to the power supply facility 200 via the communication unit 130 (step S30). The controller 180 then transmits, to the power supply facility 200 via the communication unit 130, the guiding control indication signal indicating that the guiding control to guide the vehicle to the electric power transmitting unit 220 is being performed, and the controller 180 continues transmitting the guiding control indication signal until the alignment of the electric power transmitting unit 220 and the electric power receiving unit 110 is completed (step S40).

The controller 180 then performs the guiding control (first guiding control) based on the image information provided from the camera 120 by the above method (step S50). This first guiding control is continued until the electric vehicle 100 approaches the power supply facility 200 to cause the electric power transmitting unit 220 to be positioned under the vehicle body and it becomes impossible to recognize the electric power transmitting unit 220 based on the image information provided from the camera 120 (step S60).

When it becomes impossible to recognize the electric power transmitting unit 220 based on the image information provided from the camera 120 (YES in step S60), the controller 180 estimates the distance between the electric power transmitting unit 220 and the electric power receiving unit 110 by the above method based on the electric power information transmitted from the power supply facility 200 (voltage and electric current output from the power supply facility 200). The controller 180 performs the guiding control (second guiding control) based on the distance information obtained by estimation based on the status of the power supply from the electric power transmitting unit 220 to the electric power receiving unit 110 (step S70).

During the second guiding control, the controller 180 determines whether the distance between the electric power transmitting unit 220 and the electric power receiving unit 110 has been minimized by the above-described method, based on the derivative of the distance between the electric power transmitting unit 220 and the electric power receiving unit 110 (step S80). When it is determined that the distance between the electric power receiving unit 220 and the electric power receiving unit 110 has been minimized (YES in step S80), the controller 180 stops the vehicle and activates the electric parking brake (step S90).

The controller 180 then transmits, to the power supply facility 200 via the communication unit 130, the instruction to perform the substantial power supply from the power supply facility 200 to the electric vehicle 100 (step S100). The controller 180 also turns on the system main relay SMR2 and drives the DC/DC converter 142 to perform the charging control to charge the electricity storage device 150 (step S110).

On the other hand, in the power supply facility 200, when the communication unit 240 receives the activation instruction transmitted from the electric vehicle 100 (YES in step S200), the ECU 270 activates the power supply facility 200 (step S210). Subsequently, when the communication unit 240 receives the instruction to turn on the luminous portion 230 transmitted from the electric vehicle 100 (YES in step S220), the ECU 270 turns on the luminous portion 230 (step S230). Next, when the communication unit 240 receives the guiding control indication signal transmitted from the electric vehicle 100 (YES in step S240), the ECU 270 controls the output of the high-frequency AC power driver 260 so that the predetermined electric power lower than the electric power output during the charging operation is output (step S250).

While the ECU 270 receives the guiding control indication signal, the ECU 270 transmits, as the electric power information of the power supply facility 200, the detected value of the voltage VS sent from the voltage sensor 272 that indicates the magnitude of the voltage output from the power supply facility 200 and the detected value of the electric current IS sent from the current sensor 274 that indicates the magnitude of the electric current output from the power supply facility 200, to the electric vehicle 100 via the communication unit 240 (step S260).

When the communication unit 240 receives the instruction to supply electric power transmitted from the electric vehicle 100 (YES in step S270), the ECU 270 controls the output of the high-frequency AC power driver 260 so that the vehicle charging electric power is output (step S280).

As described above, in the guiding control shown in FIGS. 15 to 24B, the parking control of the electric vehicle 100 is performed in two steps. In the first step, the positional relation between the electric power transmitting unit 220 and the electric power receiving unit 110 is detected based on the image information provided from the camera 120 mounted on the vehicle, and the vehicle is controlled, based on the detection result, so that the vehicle is guided to the electric power transmitting unit 220 (first guiding control). In the second step, the distance L between the electric power transmitting unit 220 and the electric power receiving unit 110 is detected based on the status of the power supply from the electric power transmitting unit 220 to the electric power receiving unit 110. When the vehicle approaches the electric power transmitting unit 220 so close that the electric power transmitting unit 220 becomes positioned under the vehicle body and it becomes impossible for the camera 120 to capture the electric power transmitting unit 220, the vehicle is controlled so that the alignment of the electric power transmitting unit 220 and the electric power receiving unit 110 is performed based on the information on the distance between the electric power transmitting unit 220 and the electric power receiving unit 110 that is detected based on the status of the power supply from the electric power transmitting unit 220 to the electric power receiving unit 110 (second guiding control). This makes it possible to perform the alignment of the electric power transmitting unit 220 of the power supply facility 200 and the electric power receiving unit 110 mounted on the vehicle without installing a large scale facility. Thus, according to the guiding control shown in FIGS. 15 to 24B, the vehicle power supply system 10 that is simple in configuration can be obtained while securing the accuracy in parking the vehicle at the power supply facility 200.

In addition, in the guiding control shown in FIGS. 15 to 24B, when the distance between the power supply facility 200 and the electric vehicle 100 is large, the guiding control (first guiding control) using the image information is performed, and, after the distance between the power supply facility 200 and the electric vehicle 100 becomes small, the guiding control (second guiding control) using the distance information that requires electric power transmission from the electric power transmitting unit 220 is performed. The electric power output through the electric power transmitting unit 220 during the second guiding control is lower than the electric power output after the charging control is started. Thus, according to the guiding control shown in FIGS. 15 to 24B, it is possible to minimize the electric power consumption. In particular, according to the electric vehicle 100 of the embodiment, the distance traveled from when the electric power transmitting unit 220 becomes out of the view area R to when the electric power transmitting unit 220 and the electric power receiving unit 110 face each other is small, so that the period of time, during which the guiding control using the distance information is performed, is reduced and it is possible to minimize the electric power used during the guiding control performed using the distance information.

According to the electric vehicle 100 of the embodiment, the period of time, during which the electric power transmitting unit 220 is out of the view area R of the camera 120, in the process of aligning the electric power receiving unit 110 and the electric power transmitting unit 220 is minimized. The guiding accuracy of the guiding control (first guiding control) using the image information is higher than the guiding accuracy of the guiding control (second guiding control) using the distance information. For this reason, according to the electric vehicle 100 of the embodiment, the period of time, during which the guiding control using the image information is performed, in the process of aligning the electric power receiving unit 110 and the electric power transmitting unit 220 is increased, so that it is possible to obtain a high alignment accuracy.

In addition, when the guiding control using the distance information is started, the electric power receiving unit 110 and the electric power transmitting unit 220 partially overlap each other when viewed from above, so that it is also possible to improve the guiding accuracy of the guiding control using the distance information.

In addition, according to the guiding control shown in FIGS. 15 to 24B, the power supply facility 200 is activated by the instruction transmitted from the electric vehicle 100 that receives electric power from the power supply facility 200, and the luminous portion 230 is turned on by the instruction transmitted from the electric vehicle 100. Thus, according to the guiding control shown in FIGS. 15 to 24B, the waste of the electric power while the charging is not performed is suppressed.

Although the control is switched from the first guiding control using the image information provided from the camera 120 to the second guiding control using the distance information when the electric power transmitting unit 220 becomes positioned in the blind spot of the camera 120 in the guiding control shown in FIGS. 15 to 24B, the control may be switched from the first guiding control to the second guiding control when the vehicle approaches the electric power transmitting unit 220 within a predetermined distance of the electric power transmitting unit 220. The above predetermined distance may be set to the distance, within which the electric power receiving unit 110 can receive electric power from the electric power transmitting unit 220, for example.

Although the electric power information of the power supply facility 200 is transmitted to the electric vehicle 100 and the distance information is generated on the vehicle side based on the electric power information in the guiding control shown in FIGS. 15 to 24B, the distance information may be generated on the power supply facility 200 side based on the electric current output from the power supply facility 200 or by transmitting, from the electric vehicle 100 to the power supply facility 200, the electric power received by the vehicle, and the distance information may be then transmitted to the electric vehicle 100. Alternatively, the power supply facility 200 may have the distance information and the determination as to whether the second guiding control is completed based on the distance information may be made on the power supply facility 200 side.

Although the driver operates the accelerator and the brake during the first guiding control and the accelerator and the brake are automatically operated during the second guiding control in the guiding control shown in FIGS. 15 to 24B, the accelerator and the brake may be automatically operated also during the first guiding control, or alternatively, the accelerator and the brake may be operated by the driver also during the second guiding control.

Although the camera 120 is disposed at the rear of the vehicle in the guiding control shown in FIGS. 15 to 24B, the position, at which the camera 120 is disposed, is not limited to the rear of the vehicle.

Although the electric power is transmitted from the power supply facility 200 to the electric vehicle 100 in a non-contact manner by the resonance method in the guiding control shown in FIGS. 15 to 24B, the method of transmitting electric power from the power supply facility 200 to the electric vehicle 100 is not limited to the resonance method but may be another non-contact electric power transmitting method, such as an electric power transmitting method using electromagnetic induction or an electric power transmitting method using microwaves. Also in these electric power transmitting methods, it is possible to estimate the distance between an electric power transmitting unit and an electric power receiving unit based on the status of the power supply from a power supply facility to a vehicle.

Although the position and the orientation of the electric power transmitting unit 220 are recognized by image recognition using the luminous portion 230 in the guiding control shown in FIGS. 15 to 24B, the profile or the like of the electric power transmitting unit 220 may be recognized by image recognition without providing the luminous portion 230. When the luminous portion 230 is provided as in the case of the guiding control shown in FIGS. 15 to 24B, it is possible to recognize the position and the orientation of the electric power transmitting unit 220 even at night.

Although the electric power is transmitted by causing a pair of self-resonant coils to resonate with each other in the guiding control shown in FIGS. 15 to 24B, a high-dielectric constant material disc made of a high-dielectric constant material may be used as the resonator instead of the self-resonant coil.

Although the description of the guiding control shown in FIGS. 15 to 24B is made in the case where the electric vehicle is a series-parallel hybrid vehicle, in which the motive power from the engine 176 is distributed by the power distributing mechanism 177 to be transmitted to the driving wheel 178 and the motor generator 172, the invention can be applied to other types of hybrid vehicles. Specifically, for example, the invention can be applied to what is called a series hybrid vehicle, in which the engine 176 is used only to drive the motor generator 172 and the driving force to drive the vehicle is generated by the motor generator 174 only, to a hybrid vehicle, in which, out of the kinetic energy generated by the engine 176, the regenerated energy only is recovered as the electric energy, and to a motor-assisted hybrid vehicle, in which the engine functions as the primary motive power source and the motor assists the engine as needed.

The invention can also be applied to a pure electric vehicle that is equipped with no engine 176 and runs on electric power only and to a fuel cell vehicle that further includes a fuel cell as the DC power source in addition to the electricity storage device 150. The invention can also be applied to an electric vehicle equipped with no step-up converter 162 and to an electric vehicle equipped with no DC/DC converter 142.

In the guiding control shown in FIGS. 15 to 24B, the camera 120 and the IPA-ECU 410 form the "first detecting means" (first detecting portion) of the invention, and the WA-ECU 410 and the EPS 420 form the "first guiding control means" (first guiding control portion) of the invention. The resonance ECU 460 functions as the "second detecting means" (second detecting portion) of the invention and the HV-ECU 470, the MG-ECU 430, and the ECB 440 form the "second guiding control means" (second guiding control portion) of the invention.

The camera 120 functions as the "image capturing device" of the invention and the IPA-ECU 410 functions as the "image recognition portion" of the invention. The communication units 130 and 240 form the "communication means" of the invention and the primary self-resonant coil 224 functions as the "electric power transmitting coil" of the invention. The secondary self-resonant coil 112 functions as the "electric power receiving coil" of the invention and the resonance ECU 460 functions as the "distance estimating portion" of the invention. The EPS 420 functions as the "first control portion" of the invention and the MG-ECU 430 and the ECB 440 form the "second control portion" of the invention. The high-frequency AC power driver 260 and the ECU 270 form the "electric power control portion" of the invention.

It should be understood that the embodiment described in this description is not restrictive but is merely an example. The scope of the invention is determined not by the above description of the embodiment but by the claims and it is intended to embrace all the modifications made within the scope of the claims and the equivalent thereof.

The invention can be applied to electric vehicles and in particular, suitably applied to an electric vehicle that receives, in a non-contact manner, electric power from an electric power transmitting coil provided externally to the vehicle.

The invention claimed is:

1. A vehicle that receives electric power, in a non-contact manner, from an electric power transmitting coil in a power supply facility provided externally to the vehicle, the vehicle comprising:

an electric power receiving coil that is disposed at a bottom of the vehicle and receives electric power from the electric power transmitting coil via electromagnetic field resonance;

an image capturing device that captures an image of an outside viewed from the vehicle;

a display unit that displays an outside view from the vehicle that is captured by the image capturing device;

a first guiding control portion that guides the vehicle to a position at which the electric power transmitting coil is provided based on the image of the outside viewed from the vehicle captured by the image capturing device;

a second guiding control portion that guides the vehicle to the position at which the electric power transmitting coil is provided, based on at least one of (i) a voltage of electric power which the electric power receiving coil receives from the electric power transmitting coil, and (ii) information on an electric power output which a communication unit mounted on the vehicle receives from the power supply facility; and a controller configured to switch between (i) the first guiding control portion guiding the vehicle to the position at which the electric power transmitting coil is provided when the electric power transmitting coil is recognized by the image capturing device, and (ii) the second guiding control portion guiding the vehicle to the position at which the electric power transmitting coil is provided when the electric power transmitting coil is not recognized by the image capturing device, wherein the electric power receiving coil is disposed at a position that is offset toward a peripheral face, on which the image capturing device is disposed, with respect to a center of the bottom in a longitudinal direction of the vehicle.

2. The vehicle according to claim 1, wherein
the image capturing device is disposed at a back face of the vehicle, and
the electric power receiving coil is disposed at the position that is offset toward the back face with respect to the center of the bottom in the longitudinal direction of the vehicle.

3. The vehicle according to claim 2, further comprising a pair of rear wheels that are spaced apart from each other in a width direction of the vehicle, wherein the electric power receiving coil is disposed between the rear wheels.

4. The vehicle according to claim 3, further comprising:
a hollow bobbin fitted with the electric power receiving coil; and
an electrical device disposed inside the bobbin.

5. The vehicle according to claim 1, further comprising a first side frame and a second side frame, each extending in the longitudinal direction of the vehicle, that are arranged along the width direction of the vehicle,
wherein the electric power receiving coil is disposed between the first and second side frames.

6. The vehicle according to claim 1, further comprising a battery mounted in the vehicle,
wherein the battery is disposed above the electric power receiving coil.

7. The vehicle according to claim 1, wherein the electric power receiving coil is disposed so as to be spaced from a side periphery of the vehicle.

8. The vehicle according to claim 1, wherein the electric power receiving coil is positioned at a center of the vehicle in a width direction of the vehicle.

9. The vehicle according to claim 1, further comprising:
an engine; and
an exhaust pipe connected to the engine,
wherein the exhaust pipe is disposed at the bottom and is disposed on one lateral side of the vehicle, and the electric power receiving coil is disposed on the other lateral side of the vehicle.

10. The vehicle according to claim 1, further comprising:
a first detecting portion that detects a positional relation between an electric power transmitting unit including the electric power transmitting coil and an electric power receiving unit including the electric power receiving coil, the first guiding control portion being configured to control the vehicle based on a result of detection by the first detecting portion so that the vehicle is guided to the position of the electric power transmitting unit; and
a second detecting portion that detects a distance between the electric power transmitting unit and the electric power receiving unit based on a status of power supply from the electric power transmitting unit to the electric power receiving unit, the second guiding control portion being configured to, when the vehicle is caused to approach the electric power transmitting unit within a predetermined distance of the electric power transmitting unit by the first guiding control portion, control the vehicle based on a result of detection by the second detecting portion so that the electric power transmitting unit and the electric power receiving unit are aligned.

11. A vehicle that receives electric power, in a non-contact manner, from an electric power transmitting coil provided externally to the vehicle, the vehicle comprising:
an electric power receiving coil that is disposed at a bottom of the vehicle and receives electric power from the electric power transmitting coil via electromagnetic field resonance;
an image capturing device that captures an image of an outside viewed from the vehicle;
a display unit that displays an outside view from the vehicle that is captured by the image capturing device; and
a first guiding control portion that guides the vehicle to a position at which the electric power transmitting coil is provided based on the image of the outside viewed from the vehicle captured by the image capturing device;
a second guiding control portion that guides the vehicle to the position at which the electric power transmitting coil is provided, based on a status of a power supply from the electric power transmitting coil to the electric power receiving coil, the status of the power supply being obtained based on at least one of (i) an electric power output from the electric power transmitting coil and (ii) an electric power input to the electric power receiving coil; and
a controller configured to switch between (i) the first guiding control portion guiding the vehicle to the position at which the electric power transmitting coil is provided when the electric power transmitting coil is recognized by the image capturing device, and (ii) the second guiding control portion guiding the vehicle to the position at which the electric power transmitting coil is provided when the electric power transmitting coil is not recognized by the image capturing device,
wherein the electric power receiving coil is disposed at a position that is offset toward a peripheral face, on which the image capturing device is disposed, with respect to a center of the bottom in a longitudinal direction of the vehicle.

12. A vehicle that receives electric power, in a non-contact manner, from an electric power transmitting coil in a power supply facility provided externally to the vehicle, the vehicle comprising:
an electric power receiving coil that is disposed at a bottom of the vehicle and receives electric power from the electric power transmitting coil via electromagnetic field resonance;
an image capturing device that captures an image of an outside viewed from the vehicle;
a display unit that displays an outside view from the vehicle that is captured by the image capturing device;
a first guiding control portion that guides the vehicle to a position at which the electric power transmitting coil is provided based on the image of the outside viewed from the vehicle captured by the image capturing device;
a second guiding control portion that guides the vehicle to the position at which the electric power transmitting coil is provided, based on information on a distance between the electric power transmitting coil and the electric power receiving coil of the vehicle; and a controller configured to switch between (i) the first guiding control portion guiding the vehicle to the position at which the electric power transmitting coil is provided when the electric power transmitting coil is recognized by the image capturing device, and (ii) the second guiding control portion guiding the vehicle to the position at which the electric power transmitting coil is provided when the electric power transmitting coil is not recognized by the image capturing device, wherein the power supply facility detects the distance between the electric power transmitting coil and the electric power receiving coil of the vehicle based on a voltage of an electric power output from the electric power transmitting coil and a voltage of an electric power input to the electric power receiving coil, and the electric power receiving coil is disposed at a position that is offset toward a peripheral face, on which the image capturing device is disposed, with respect to a center of the bottom in a longitudinal direction of the vehicle.

* * * * *